US009229248B2

(12) United States Patent
Kokonaski et al.

(10) Patent No.: US 9,229,248 B2
(45) Date of Patent: Jan. 5, 2016

(54) ELECTRO-ACTIVE SPECTACLES AND ASSOCIATED ELECTRONICS

(71) Applicant: Mitsui Chemicals, Inc., Tokyo (JP)

(72) Inventors: William Kokonaski, Gig Harbor, WA (US); Yongping Wang, Philadelphia, PA (US); Ronald D. Blum, Roanoke, VA (US); Mark Graham, Madison Heights, VA (US); Claudio Dalla Longa, Valdobbiadene (IT); Sambo S. He, Riverside, CA (US); Christian Krutzik, Costa Mesa, CA (US)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/919,740

(22) Filed: Jun. 17, 2013

(65) Prior Publication Data

US 2013/0278881 A1   Oct. 24, 2013

Related U.S. Application Data

(63) Continuation of application No. 12/684,490, filed on Jan. 8, 2010, now abandoned.

(60) Provisional application No. 61/143,459, filed on Jan. 9, 2009, provisional application No. 61/152,140, filed on (Continued)

(51) Int. Cl.
G02C 5/14       (2006.01)
G02C 5/22       (2006.01)
(Continued)

(52) U.S. Cl.
CPC  G02C 11/10 (2013.01); G02C 5/14 (2013.01); G02C 7/083 (2013.01); G02C 7/101 (2013.01); G02C 5/22 (2013.01); H02J 7/0044 (2013.01); H02J 7/025 (2013.01)

(58) Field of Classification Search
CPC .... G02C 7/101; G02C 7/083; G02C 2200/10; G02C 7/02; G02C 11/10
USPC ........... 351/159.03, 159.39–4, 158, 103, 108, 351/154, 106, 153, 104, 111
See application file for complete search history.

(56) References Cited

U.S. PATENT DOCUMENTS 2,830,132 A * 4/1958 Borg .............................. 351/158
2,930,857 A   3/1960 Hollingsworth
(Continued)

FOREIGN PATENT DOCUMENTS

CN   101088041 A   12/2007
CN   201078762 Y   6/2008
(Continued)

OTHER PUBLICATIONS

"Hearing Mojo: Varibel Hearing-Aid Glasses Integrate Eight Directional Microphones," Feb. 27, 2009, pp. 1-4. URL—http://hearingmojo.com/blog-mt/blog-mt/2006/04/varibel_hearingaid_glasses_dou.html.
(Continued)

*Primary Examiner* — Zachary Wilkes
(74) *Attorney, Agent, or Firm* — Sterne, Kessler, Goldstein & Fox P.L.L.C.

(57) ABSTRACT

Aspects of the present invention provide electronics for controlling and synchronizing operation of electro-active lenses regardless of frame type, size or style. The controlling electronics can be contained within one or more electronic modules positioned within the frame temples and can be removable and reprogrammable and can include inductive charge regions. Conductive links between electronic modules and/or between left and right Sides of the electro-active spectacles can include left and right upper and lower rim portions of the frame, the bridge, conductive layers of the electro-active lenses, the upper and lower grooves of the electro-active lenses, and/or wires embedded within any portion of the frame. Aspects of the present invention also provide chargers for recharging electro-active spectacles of any size, shape or style using adjustable inductive charging cradles to inductively charge electro-active spectacles of the present invention.

15 Claims, 18 Drawing Sheets

Related U.S. Application Data on Feb. 12, 2009, provisional application No. 61/157,579, filed on Mar. 5, 2009, provisional application No. 61/157,580, filed on Mar. 5, 2009, provisional application No. 61/170,222, filed on Apr. 17, 2009, provisional application No. 61/242,406, filed on Sep. 15, 2009, provisional application No. 61/252,770, filed on Oct. 19, 2009.

(51) Int. Cl.

| | | |
|---|---|---|
| G02C 7/02 | (2006.01) | |
| G02C 11/00 | (2006.01) | |
| G02C 7/08 | (2006.01) | |
| G02C 7/10 | (2006.01) | |
| H02J 7/00 | (2006.01) | |
| H02J 7/02 | (2006.01) | |

(56) References Cited

U.S. PATENT DOCUMENTS

| | | | | |
|---|---|---|---|---|
| 3,245,315 | A * | 4/1966 | Marks et al. | 351/159.6 |
| 3,620,866 | A * | 11/1971 | Letter | 156/102 |
| 4,152,846 | A | 5/1979 | Witt | |
| 4,283,127 | A | 8/1981 | Rosenwinket et al. | |
| 4,418,990 | A | 12/1983 | Gerber | |
| 4,756,605 | A * | 7/1988 | Okada et al. | 351/158 |
| 4,875,030 | A | 10/1989 | Chiu | |
| 4,907,860 | A | 3/1990 | Noble | |
| 4,967,268 | A | 10/1990 | Lipton et al. | |
| 4,991,258 | A | 2/1991 | Drlik | |
| 4,991,951 | A | 2/1991 | Mizuno et al. | |
| 5,114,218 | A * | 5/1992 | Black et al. | 351/44 |
| 5,182,585 | A | 1/1993 | Stoner | |
| 5,455,638 | A | 10/1995 | Kallman et al. | |
| 5,463,428 | A | 10/1995 | Lipton et al. | |
| 5,657,107 | A | 8/1997 | Wagner et al. | |
| 5,742,379 | A | 4/1998 | Reifer | |
| 5,760,869 | A | 6/1998 | Mitamura | |
| 5,764,338 | A | 6/1998 | Mack | |
| 5,835,185 | A | 11/1998 | Kallman et al. | |
| 6,097,450 | A | 8/2000 | Humphrey | |
| 6,115,177 | A | 9/2000 | Vossler | |
| 6,336,250 | B1 | 1/2002 | Takeda et al. | |
| 6,582,075 | B1 | 6/2003 | Swab et al. | |
| 6,595,634 | B1 | 7/2003 | Pilat, Jr. | |
| 6,626,532 | B1 | 9/2003 | Nishioka et al. | |
| 6,719,425 | B2 | 4/2004 | Conner | |
| 6,866,386 | B1 | 3/2005 | Chen | |
| 6,871,951 | B2 * | 3/2005 | Blum et al. | 351/159.03 |
| 7,009,757 | B2 | 3/2006 | Nishioka et al. | |
| 7,063,420 | B2 | 6/2006 | Lerner et al. | |
| 7,104,645 | B2 | 9/2006 | Pilat, Jr. | |
| 7,140,727 | B2 | 11/2006 | Pilat, Jr. et al. | |
| 7,175,273 | B2 * | 2/2007 | Lee | 351/158 |
| 7,290,875 | B2 * | 11/2007 | Blum et al. | 351/159.39 |
| 7,380,936 | B2 * | 6/2008 | Howell et al. | 351/158 |
| 7,425,066 | B2 | 9/2008 | Blum et al. | |
| 7,784,935 | B2 | 8/2010 | Jackson et al. | |
| 7,813,048 | B2 | 10/2010 | Lynch et al. | |
| 8,778,022 | B2 | 7/2014 | Blum et al. | |
| 2001/0007493 | A1 | 7/2001 | Masunaga et al. | |
| 2001/0043266 | A1 | 11/2001 | Robinson et al. | |
| 2002/0140899 | A1 | 10/2002 | Blum et al. | |
| 2004/0000733 | A1 | 1/2004 | Swab et al. | |
| 2004/0156012 | A1 | 8/2004 | Jannard et al. | |
| 2005/0078274 | A1 | 4/2005 | Howell et al. | |
| 2005/0225723 | A1 | 10/2005 | Pilu | |
| 2005/0237485 | A1 | 10/2005 | Blum et al. | |
| 2005/0242771 | A1 | 11/2005 | Blum et al. | |
| 2005/0264752 | A1 | 12/2005 | Howell et al. | |
| 2005/0270479 | A1 | 12/2005 | Canavan et al. | |
| 2005/0270481 | A1 | 12/2005 | Blum et al. | |
| 2006/0023158 | A1 | 2/2006 | Howell et al. | |
| 2006/0092340 | A1 | 5/2006 | Blum et al. | |
| 2006/0203186 | A1 | 9/2006 | Ifergan | |
| 2007/0121061 | A1 | 5/2007 | Kim | |
| 2007/0258039 | A1 | 11/2007 | Duston et al. | |
| 2007/0296918 | A1 | 12/2007 | Blum et al. | |
| 2008/0106695 | A1 | 5/2008 | Kokonaski et al. | |
| 2008/0273166 | A1 | 11/2008 | Kokonaski et al. | |
| 2008/0316420 | A1 | 12/2008 | Agazarova | |
| 2009/0002626 | A1 | 1/2009 | Wakabayashi | |
| 2009/0264966 | A1 | 10/2009 | Blum et al. | |
| 2010/0177277 | A1 | 7/2010 | Kokonaski et al. | |
| 2010/0201938 | A1 | 8/2010 | Jackson et al. | |
| 2010/0309426 | A1 | 12/2010 | Howell et al. | |
| 2011/0058141 | A1 * | 3/2011 | Cozzani | 351/158 |
| 2013/0235332 | A1 | 9/2013 | Blum et al. | |
| 2013/0242253 | A1 | 9/2013 | Blum et al. | |

FOREIGN PATENT DOCUMENTS

| | | |
|---|---|---|
| DE | 2 304 134 A | 8/1973 |
| EP | 0 061 002 A1 | 9/1982 |
| EP | 1 647 854 A1 | 4/2006 |
| EP | 1 727 393 A1 | 11/2006 |
| EP | 1 916 561 A2 | 4/2008 |
| EP | 2 233 964 A1 | 9/2010 |
| GB | 1 563 929 | 4/1980 |
| GB | 2 170 613 A | 8/1986 |
| JP | S58-113913 | 7/1983 |
| JP | S61-182014 | 8/1986 |
| JP | 3063144 U | 10/1999 |
| JP | 2008/083299 A | 4/2008 |
| JP | 2008-519317 A | 6/2008 |
| JP | 2009-294654 A | 12/2009 |
| WO | WO 99/21400 A1 | 4/1999 |
| WO | WO 01/02895 A1 | 1/2001 |
| WO | WO 01/35159 A1 | 5/2001 |
| WO | WO 2004/028203 A2 | 4/2004 |
| WO | WO 2005/016057 A1 | 2/2005 |
| WO | WO 2006/050366 A2 | 5/2006 |
| WO | WO 2006/086155 A2 | 8/2006 |
| WO | WO 2006/126881 A2 | 11/2006 |
| WO | WO 2007/142520 A1 | 12/2007 |
| WO | WO 2008/002388 A2 | 1/2008 |
| WO | WO 2008/046858 A1 | 4/2008 |
| WO | WO 2008/051520 A2 | 5/2008 |
| WO | WO 2008/091896 A2 | 7/2008 |
| WO | WO 2009/081542 A1 | 7/2009 |
| WO | WO 2009/098719 A1 | 8/2009 |
| WO | WO 2009/126946 A1 | 10/2009 |
| WO | WO 2009/136667 A1 | 11/2009 |
| WO | WO 2010/062504 A2 | 6/2010 |
| WO | WO 2010/080999 A1 | 7/2010 |

OTHER PUBLICATIONS

Partial International Search Report in corresponding PCT/US2010/020498 application, mailed Jun. 25, 2010.
International Search Report and Written Opinion in corresponding PCT/US2008/058056 application, mailed Jul. 17, 2008.
International Search Report corresponding to the PCT/US2011/042883 application, mailed Jul. 2, 2012.
International Search Report corresponding to the PCT/US2011/042882 application, mailed Dec. 2, 2011.
International Search Report corresponding to the PCT/US2011/061505 application, mailed Feb. 29, 2012.
International Search Report corresponding to the PCT/US2011/061495 application, mailed Feb. 29, 2012.
International Search Report corresponding to the PCT/US2011/043591 application, mailed Feb. 3, 2012.
International Search Report corresponding to the PCT/US2011/042882 application, mailed Feb. 15, 2012.
International Search Report corresponding to the PCT/US2012/051202 application, mailed Jan. 8, 2013.
European Search Report in related EP07852880.9 application, mailed Jan. 29, 2010.
U.S. Appl. No. 61/361,110, filed Jul. 2, 2010.
U.S. Appl. No. 61/276,719, filed Aug. 25, 2010.
U.S. Appl. No. 61/415,391, filed Nov. 19, 2010.

(56) References Cited

OTHER PUBLICATIONS

U.S. Appl. No. 61/362,877, filed Jul. 9, 2010.
U.S. Appl. No. 61/481,353, filed May 2, 2011.
U.S. Appl. No. 61/441,817, filed Feb. 11, 2011.
U.S. Appl. No. 12/684,490, filed Jan. 8, 2010.
U.S. Appl. No. 13/175,633, filed Jul. 1, 2011.
U.S. Appl. No. 13/175,634, filed Jul. 1, 2011.
U.S. Appl. No. 13/179,219, filed Jul. 8, 2011.
Office Action mailed Dec. 17, 2013, in Japanese Patent Application No. 2011-545454, filed Jun. 28, 2012.
Translation of Office Action mailed Dec. 17, 2013, in Japanese Patent Application No. 2011-545454, filed Jun. 28, 2012.
English language Abstract of Japanese Patent Publication No. 58113913 A, Japanese Patent Office, Patent Abstracts of Japan.
English language Abstract of Japanese Patent Publication No. 61182014 A, Japanese Patent Office, Patent Abstracts of Japan.
Office Action mailed Apr. 25, 2014, in Chinese Patent Application No. 201310264317.1, and full English translation.
English language Abstract of Chinese Patent Publication No. CN201078762Y, State Intellectual Property Office of the People's Republic of China, Patent Search and Service System of SIPO.
English language Abstract of Chinese Patent Publication No. CN101088041A, State Intellectual Property Office of the People's Republic of China, Patent Search and Service System of SIPO.
Patent Examination Report No. 1 issued in Australian Patent Application No. 2010203515 on Apr. 10, 2014.
Office Action mailed Feb. 28, 2013, in Chinese Patent Application No. 201080008602.1, and full English translation.

\* cited by examiner

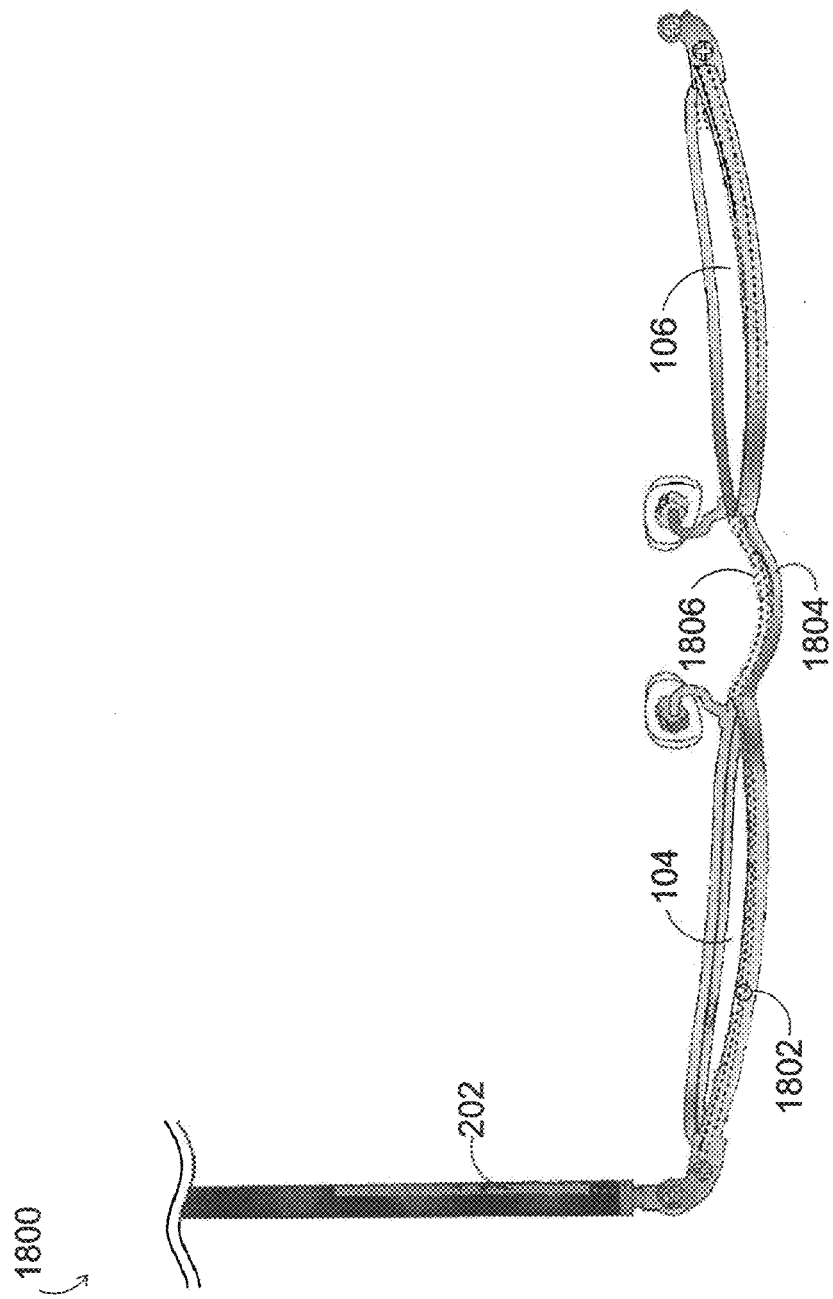

ELECTRO-ACTIVE SPECTACLES AND ASSOCIATED ELECTRONICS

CROSS-REFERENCE TO RELATED APPLICATIONS

This application is a continuation of U.S. application Ser. No. 12/684,490, which is incorporated herein by reference in its entirety, and which claims priority from the following provisional applications:

U.S. Appl. No. 61/143,459, filed on Jan. 9, 2009;
U.S. Appl. No. 61/152,140, filed on Feb. 12, 2009;
U.S. Appl. No. 61/157,579, filed on Mar. 5, 2009;
U.S. Appl. No. 61/157,580, filed on Mar. 5, 2009;
U.S. Appl. No. 61/170,222, filed on Apr. 17, 2009;
U.S. Appl. No. 61/242,406, filed on Sep. 15, 2009; and
U.S. Appl. No. 61/252,770, filed on Oct. 19, 2009.

Each of the provisional applications mentioned above is incorporated herein by reference in its entirety.

BACKGROUND OF THE INVENTION

1. Field of the Invention

The present invention generally relates to electro-active spectacles, More specifically, the present invention provides electronics for operating and synchronizing electro-active lenses compatible with any frame type, style or size, as well as associated charging devices.

2. Background Art

Electro-active lenses generally provide a region of adjustable optical power by changing the refractive index of an electro-active material (e.g., a liquid crystal material) by the application and removal of electrical power. Conventional electro-active lenses and spectacles fail to provide cosmetically acceptable and practical mechanisms for (a) controlling and synchronizing operation of the electro-active lenses, (b) providing electrical connectivity between controlling electronics and the electro-active lenses, and (c) recharging the electro-active lenses. Further, conventional devices and techniques for addressing these problems are limited in that they are not generally compatible with any frame size, type or style.

Accordingly, what is needed are electronics for controlling and synchronizing operation of electro-active lenses that can be housed in any type of frame in a cosmetically acceptable and easily implementable manner. Further, power charger devices for recharging electro-active lenses of any frame size, shape or style are also needed.

BRIEF DESCRIPTION OF THE DRAWINGS/FIGURES

FIG. 18 illustrates electro-active spectacles in accordance with an aspect of the present invention.

DETAILED DESCRIPTION OF THE INVENTION

Aspects of the present invention provide electronics for controlling and synchronizing operation of electro-active lenses. The controlling electronics can be positioned within a variety of frame types, sizes and styles and enable efficient user interaction. The controlling electronics, or a portion thereof, can be contained within an electronic module. The electronic module can be positioned within a frame temple and can be removable and reprogrammable and can include an inductive charge region. Electro-active spectacles of the present invention can use one or more electronic modules. When a single electronic module is used, the electronic module can activate and deactivate each electro-active lens at substantially the same time. If two electronic modules are used, then a first electronic module can synchronize operation of a second electronic module to ensure coordinated operation of both electro-active lenses.

Aspects of the present invention provide connectivity between one or more electronic Modules and/or between a left-side portion and a right-side portion of electro-active spectacles. Connectivity can vary depending upon frame type. Aspects of the present invention allow electro-active spectacles to include one or More conductive links using left and right upper and lower rim portions of the frame that support the electro-active lenses, the bridge, conductive layers Of the electro-active lenses, the upper and lower grooves of the electro-active lenses, wires or other conductive links embedded within any portion of the frame, and/or a wireless connection.

Aspects of the present invention provide chargers for recharging a power source of electro-active spectacles of any size, shape or style. A slim line charger of the present invention can include a base and arms to support electro-active spectacles of the present invention. The slim line charger can include one or more adjustable inductive charging cradles to inductively charge a power source (e.g., one or more batteries) of electro-active spectacles of the present invention.

Figure 1:
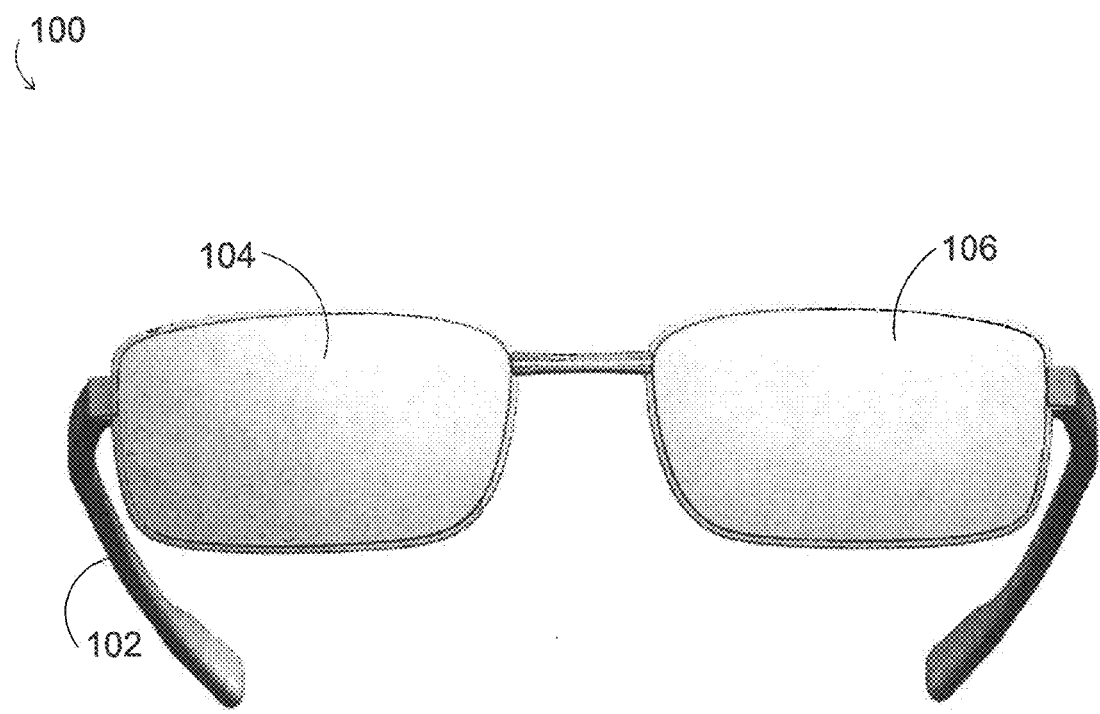
FIG. 1 illustrates electro-active spectacles in accordance with an aspect of the present invention.

FIG. 1 illustrates electro active spectacles or eyeglasses 100 in accordance with an aspect of the present invention. The electro-active spectacles 100 shown in FIG. 1 are fully rimmed eyeglasses comprising left and right temples and a frame front (the frame front can comprise left and right eyewires or rims as will be appreciated by one skilled in the pertinent art). Electro-active spectacles and frames of the present invention can be fully rimmed, partially rimmed, or rimless. The electro-active spectacles 100 can include a frame 102, a fiat electro active lens 104, and a second electro-active lens 106. The frame 102 can include left and right temple portions, a bridge, and rim portions (e.g., upper and/or lower rim portions) supporting the electro-active lenses 104 and 106. The first and second electro active lenses 104 and 106 can each be an electro-active lens as described in U.S. patent application Ser. No. 12/408,973 (hereinafter the '973 application), filed Mar. 23, 2009, entitled "Electro-Active Diffractive Lens and Method for Making the Same," which is hereby incorporated by reference in its entirety. In general, the first and second electro-active lenses 104 and 106 can be any lens or optic capable of changing, varying or tuning the optical power they each provide with the application of electricity.

The right temple portion can be considered to be :a first temple portion that is positioned adjacent to the first electroactive lens 104. The left temple portion can be considered to be a second temple portion that is positioned adjacent to the second electro-active lens 106. The bridge can be considered to be part of the frame or to be a separate portion of the electro-active spectacles 100 that connects, joins or supports the first and second electro-active lenses 104 and 106.

The electro-active spectacles 100 can include one or more power sources for powering the first and Second electroactive lenses 104 and 106. As an example, each power source can include one or more batteries (e.g., conventional rechargeable batteries and/or solar batteries). The electroactive spectacles 100 can also include electronics that can govern operation of the electro active lenses 104 and 106. The electronics can comprise one or more control units (e.g., control. unit matched to each electro-active lens) to determine when to activate and when to deactivate the electro-active lenses 104 and 106. The one or more power sources and the electronics of the electro-active spectacles 100 can be housed or contained within any portion of the frame 102. The one or more power sources and the one Or more control units of the electro-active spectacles 100 can be grouped together or distributed or dispersed in any manner within. or throughout the frame 102.

In accordance with an aspect of the present invention, the one or more power sources and the one or more control units of the electro-active spectacles 100 can be arranged in a manner that can accommodate a wide variety of frame types and styles. Specifically, an aspect of the present invention enables the one or more power sources and the one or more control units of the electro-active spectacles 100 to be arranged in a manner that can accommodate fully-rimmed, partially rimmed, and rimless frames.

In accordance with an aspect of the present invention, the operation of the electro-active lenses 104 and 106 can be synchronized. That is, the one or more control units housed in the frame 102 can coordinate the activation and deactivation of the electro-active lenses 104 and 106 such that the electro-active lenses 104 and 106 are activated or deactivated at substantially the same time.

In accordance with an aspect of the present invention, the one or more control units housed in the frame 102 can automatically operate (e.g., activate and deactivate) the electroactive lenses 104 and 106. As an example, the electro-active lenses 104 and 106 can be activated or deactivated based on a user's head tilt as sensed by the one or more control units. The one or more control units can also enable a user to interact with the electro-active lenses 102 and 104. As an example, a user can manually activate or deactivate the electro-active lenses 104 and 106, override automatic operation of the electro-active lenses 104 and 106, place the electro-active spectacles 100 into a standby mode (in which the electro-active lenses 104 and 106 are neither automatically or manually activated or deactivated), or power off the electro-active spectacles 100.

The electronics of the electro-active spectacles 100 can include a processor, memory, a power source (e.g., a battery) and a gyroscope or accelerometer. As previously mentioned, these components can be grouped together or can be distributed within different portions of the frame 102. As an example, all or a portion of these components can be grouped together to form a self-contained electronic module. The electro-active spectacles 100 can comprise a single electronic module that governs synchronized operation of both the first and second electro-active lenses 104 and 106. Alternatively, operation of the first electro-active lens 104 can be governed by a first electronic module and operation of the second electro-active lens 106 can be governed by a second electronic module. Under this scenario, the first and second electronic modules can communicate using one or more conductive wires (e.g., embedded within a portion of the frame 102), one or more conductive portions of the frame 102 (e.g., conductive metal layers or conductive cores encapsulated by non-conductive material), one or more conductive layers of the electro-active lenses 104 and 106, an optical link, and/or via a wireless communications link. Communication between the first and second electronic modules can facilitate coordinated operation of the first and second electro-active lenses 104 and 106.

Figure 2:
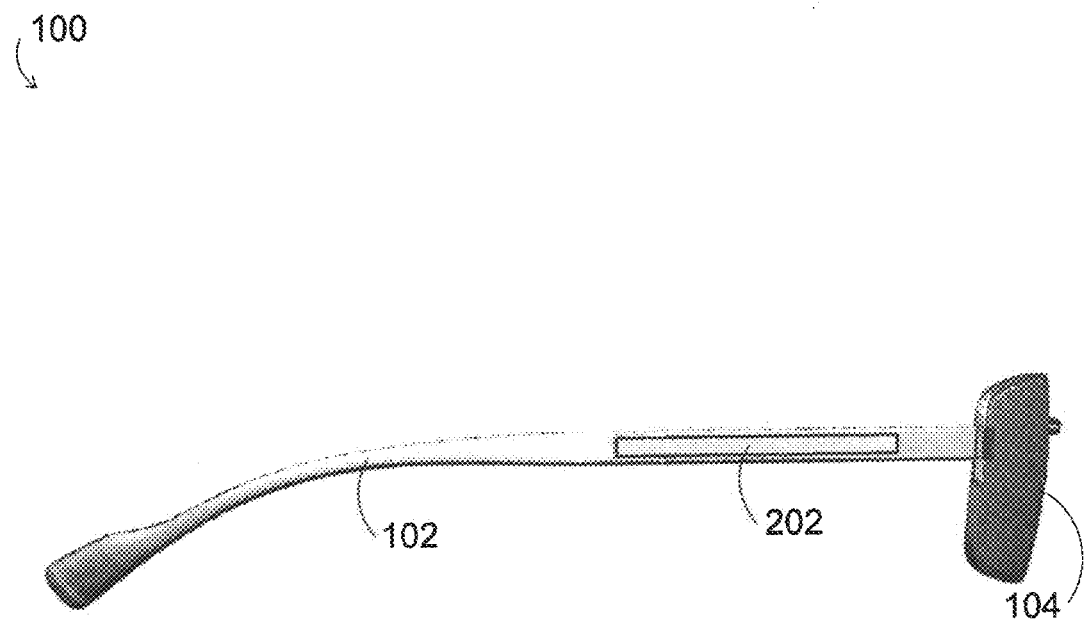
FIG. 2 illustrates a side view of the electro-active spectacles depicted in FIG. 1 in accordance with an aspect of the present invention.

FIG. 2 illustrates a side view of the electro-active spectacles 100 depicted in FIG. 1. As shown in FIG. 2, the electro-active spectacles 100 can comprise an electronic module (or control unit) 202, As described above, the electronic module 202 can include various electronics components. The electronic module 202 can be positioned near the front temple of the frame 102. The electronic module 202 can be positioned within the frame 102 (e.g., in an area or cavity of the frame 102) and can be removable and replaceable. Alternatively, the electronic module can be built into the frame 102 and form a part of the frame 102. The electronic module 202 can be located on an outer portion of a temple of the frame 102 (further from a wearer) or can be :located on an inner portion of the temple of the frame 102 (closer to the wearer). The electronic module 202 can he positioned on a left temple or a right temple of the frame 102 (i.e., on either side of the frame 102). The electronic module 202, When inserted into the temple of the frame 102, can be flush with the other portions of the frame 102. All or a portion of the electronic components used to operate the electro-active lens 104 can be contained within the electronic module 202.

The electronic module 202 can also control operation (or at least ensure synchronized operation) of the electro-active lens 106. Electrical connections between the electronic module 202 and one or more of the electro-active lenses 104 and 106 can be routed through the frame 102 and/or the electro-active lenses 104 and 106 as will be described in more detail below. According to an aspect of the present invention, connectivity between the electronic module 202 and one or more of the electro active lenses 104 and 106 can be accomplished by using a single conductive wire.

According to an aspect of the present invention, a first electrical connection (e.g., comprising one or more conductive links or wires) can be used to provide connectivity between one or more power sources of the electro-active spectacles 100 and one or more electronic modules 202 and a second electrical connection (e.g., comprising one or more conductive links or wires) can be used to provide connectivity between the one or more electronic modules 202 and the one or more electro-active lenses (e.g., the electro-active lenses 104 and 106). For example, a battery positioned within the frame 102 can be coupled to an electronic module 202 also positioned Within the frame 102 using a first conductive link. A second, distinct conductive link (e.g., electrically isolated from the first conductive link) can be used to couple the electronic module 202 to the electro-active lenses 104 and 106.

According to an aspect of the present invention, the same conductive link (e.g., comprising one or more electrical wires) can be used to couple the one or more power sources of the electro-active spectacles 100, the one or more electronic modules 202 and the electro-active lenses 104 and 106 as will he appreciated by one skilled in the pertinent art. This can enable a power source to be positioned on one side of the frame 102 (e.g., in a first temple) and an electronic module 202 to be positioned on the other side of the frame 102 (e.g., in a second temple) while using the same conductive link to simultaneously provide power to the electronic module 202 and controlling signals from the electronic module 202 to the electro-active lenses 104 and 106. As a result, the number of conductive links (e.g., embedded wires) positioned within the frame 102 can be minimized.

Figure 3:
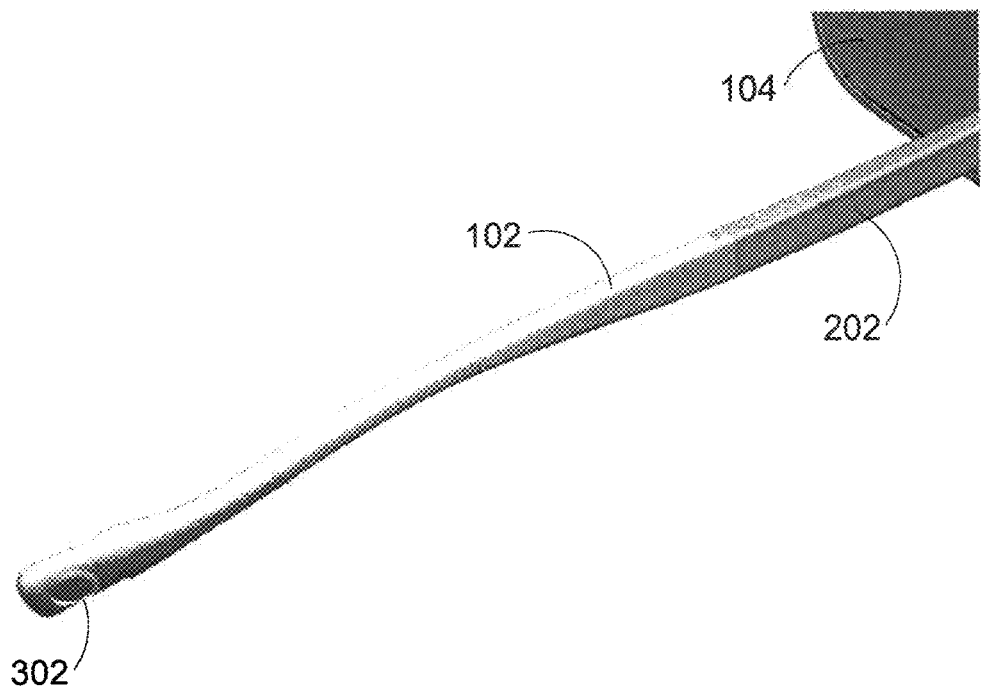
FIG. 3 illustrates an exemplary configuration of electrical components of the electro-active spectacles in accordance with an aspect of the present invention.
Figure 4:
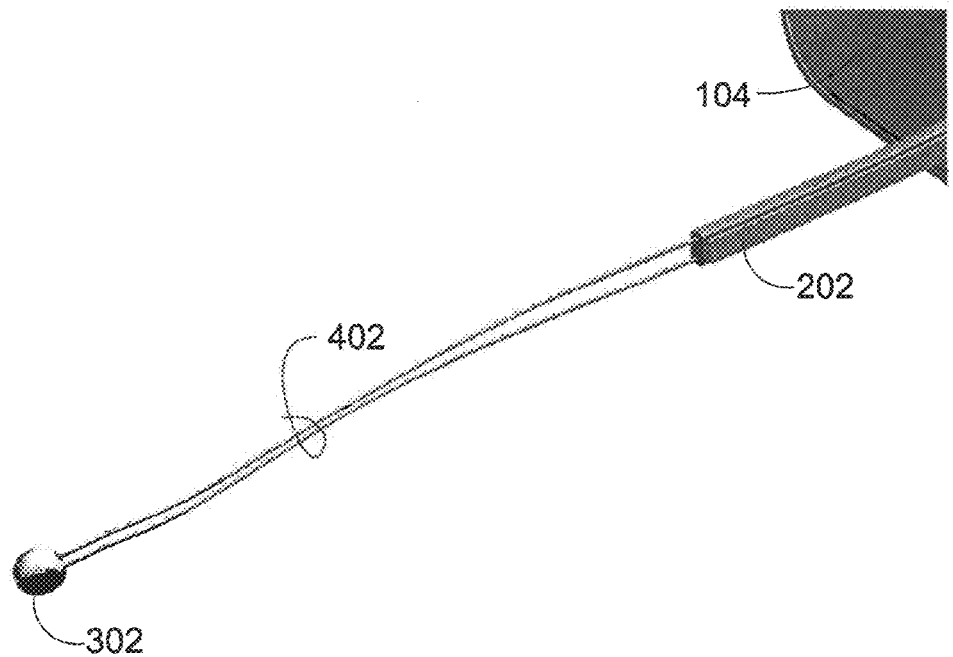
FIG. 4 illustrates an exemplary configuration of electrical connectivity between a battery and an electronic module depicted in FIG. 3 in accordance with an aspect of the present invention.

FIG. 3 illustrates an exemplary configuration of electrical components of the electro-active spectacles 100, Specifically. FIG. 3 shows a battery 302 located near the end of the frame 102 of the electro-active spectacles 100. A portion of the end of the frame 102 is removed for illustration purposes only. The battery 302 can be a rechargeable battery and can provide power to the electrical components located within the electronic Module 202. The battery 302 can provide power to one or more electronic modules of the present invention, FIG. 4 illustrates an exemplary configuration of electrical connectivity between the battery 302 depicted in FIG. 3 and the electronic module 202. A portion of the frame 102 is removed. for illustration purposes only, As shown in FIG. 4, conducting wires 402 can couple the battery 302 to the electronic module 202. The conducting wires 402 can be positioned within the frame 102 (e.g., embedded within the frame 102) of the electro-active spectacles 100.

Figure 5:
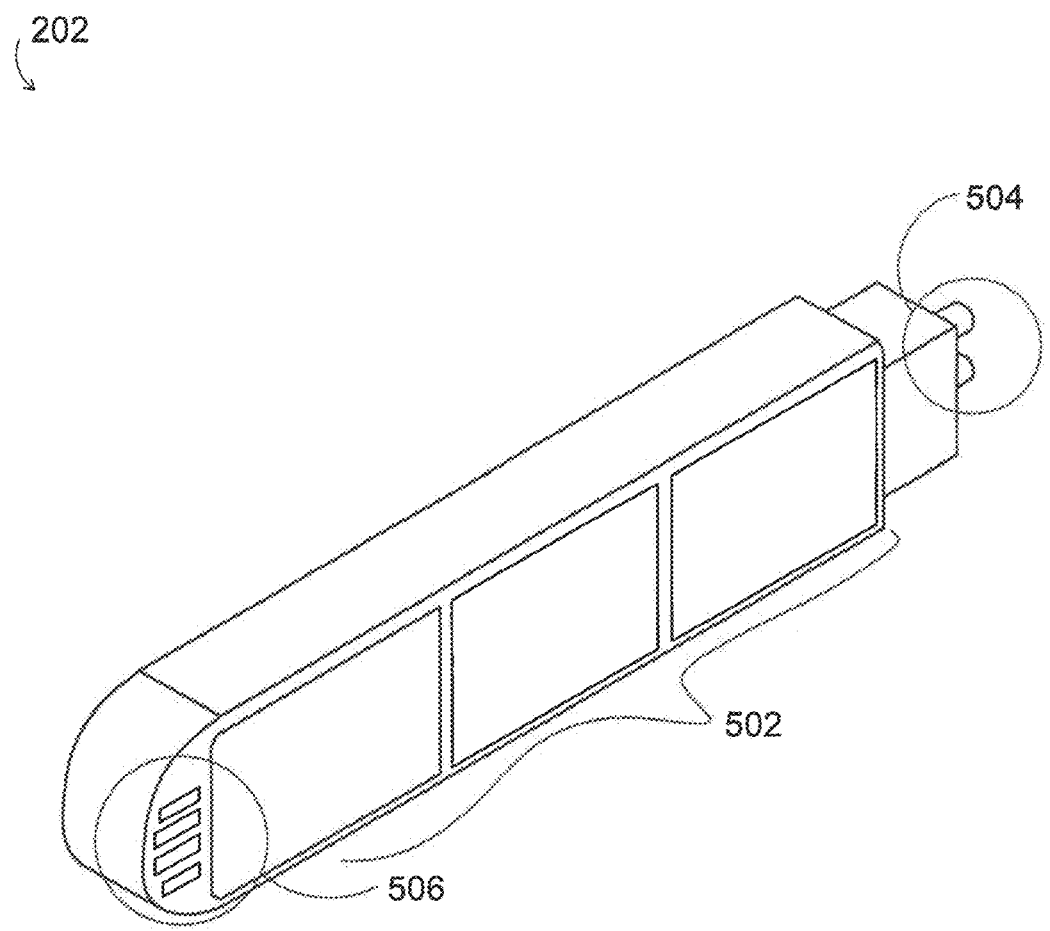
FIG. 5 illustrates an electronic module in accordance with an aspect of the present invention.

FIG. 5 illustrates the electronic module 202 in accordance with an aspect of the present invention. The electronic module 202 can contain all or a portion of the electronic components that govern operation of one or more electro-active lenses including a power source (e.g., a rechargeable battery or a solar battery). As shown in FIG. 5, the electronic module 202 can comprise a housing 502, first contacts 504 and second contacts 506. The housing 502 can contain the electrical components of the electronic module 202—e.g., a processor, memory, power source, and/or a gyroscope/accelerometer.

The first contacts 504 can provide electrical connectivity between the electrical components of the housing 502 and other portions of one or more associated electro-active lens (e.g., the first electro-active lens 104). The second contacts 506 can provide electrical connectivity to a memory of the electronic module 506. The second contacts 506 can be used, for example, to program or reprogram the electronic module 202 directly. Additional contacts not illustrated for simplicity), or the first and/or second contacts 504 and 506, can also provide connectivity to a remote battery (e.g., the battery 302 depicted in FIGS. 3 and 4) or to another electronic module or control unit. Alternative or additional contacts (e.g., an antenna) can allow wireless programming of the electronic module 202.

In general, the electronic module 202 can be positioned anywhere on the frame 102 (e.g., in any portion of the frame 102 having an area or cavity designed to accept insertion of the electronic module 202). The electronic module 202, as shown in FIG. 2, can be located near the front temple of a wide variety of frame types and styles. Specifically, the electronic module 202 can be located within a portion of a frame that is fully rimmed, partially-rimmed, or rimless. The electronic module 202 can be removed and replaced with a new module or can be reprogrammed. As an example, the electronic module 202 can be initially programmed with a first mode of operation or a first prescription for a user. At a later time, the electronic module 202 can be removed and reprogrammed using the second contacts 506 with a second mode of operation or a second prescription for a user.

As an alternative to the second contacts 506, the electronic module 202 can be reprogrammed using a wireless communication link such that removal of the electronic module 202 from the frame is not necessary to enable reprogramming. Reprogramming can include changing a specified angle of head tilt for activating or deactivating an associated electro-active lens.

The electronic module 202 can also include or be coupled to one or more light emitting diodes (LEDs). The one or more LEDs can be used to indicate operating conditions or states of the electro-active spectacles of the present invention including, but not limited to, the power level of the power source of the spectacles.

A wireless communication link between the electronic module 202 and a remote communication device can, as described above, provide a mechanism for reprogramming the electronic module 202 but can also provide a mechanism for collecting information on the operating status and history of operation of the electro-active spectacles of the present invention. Reprogramming verification (e.g., verifying successful uploaded controlling firmware) and other data collection can be enabled using such a communications link.

The one or more LEDs of the electronic module 202 can also be used to facilitate communication with a remote device. For example, the one or more LEDs can be opto-coupled to a receiving station to readout electronic module 202 operating parameters and to aid in reconfiguration or reprogramming (e.g., verifying uploaded firmware).

Additionally, a communication link between the electro-active spectacles of the present invention and a remote device can be established using the electro active lenses themselves. For example, the electro-active lenses of the present invention can be used to transmit a signal to a receiving station by encoding data with lens "flicker" as will be apparent to one skilled in the pertinent art, The electronic module 202 can contain any number of mechanism by which a user can interact with the electronic module 202 to adjust operation of the electro-active spectacles of the present invention. For example, the electronic module 202 can Maude a switch or device to enable a user to interact with the electronic module 202. The switch or device can be a press button switch, a capacitive switch (e.g., comprising a capacitive sense pad), a toggle switch or other manual switch. The switch or device can enable a user to activate or deactivate the associated electro-active lens or lenses, to override or initiate automatic operation of the associated electro-active lens or lenses, and to select a mode of operation or prescription correction for a user. A capacitive switch can be located on a surface of the electronic module 202 that is exposed or accessible when positioned in the frame 102. Alternatively, or in addition thereto, capacitive sense pads can be deposited or built into the frame 102 that can be coupled to the electronic module 202.

The electronic module 202 can also include an ability to toggle among modes or be activated or deactivated through voice activation or based on light sensitivity. For example, a user can activate or deactivate the lenses or otherwise adjust operation by issuing or speaking voice commands or instructions. Further, the electronic module 202 can be activated or deactivated or change operating modes based on the amount of light measured or sensed by electronics included in the electronic module 202. For example, in relatively low light, the electronic module 202 can be deactivated automatically (or placed into a standby, non-switchable mode) and can be activated (or switched out of a standby non-switchable mode) when in relatively bright light conditions. Lastly, the electronic module 202 can include electronics to allow remote activation or toggling of operational modes. For example, the electronic module 202 can include electronics to allow remote wireless activation or activation by a switch connected by a wired link from a position remote from the electro-active spectacles of the present invention. Remote activation may be particularly useful for individuals that are physically challenged (e.g., individuals that cannot move their arms to touch the frame temple with ease).

All of the mechanism described above can be used by a user to adjust the operation of the electro-active spectacles of the present invention. For example, a user can use one of the mechanisms described above to switch the lens from a first mode to a second mode of operation or between any number of different modes of operation. For example, a first mode of operation can be a standby mode of operation. In a standby mode of operation, the electro-active spectacles of the present invention can be placed into a non-switchable state (such that the electro-active lenses do not automatically activate or deactivate based on a sensed signal received from a tilt sensor, rangefinder or other activation/deactivation sensing device including manual control).

A second mode of operation can be an active mode of the electro-active spectacles. In the active mode of operation, the electro-active spectacles of the present invention can be placed into a switchable state (such that the electro-active lenses will automatically activate or deactivate based on a sensed signal received from a tilt sensor, rangefinder or other activation/deactivation sensing device or will respond to direct manual control to activate or deactivate).

The electro-active spectacles of the present invention can also include additional operational states or modes that the user can use (and toggle or transition between them using one of the interaction mechanism described above). For example, the electro-active spectacle of the present invention can include a manual operation state. In a manual operation state, the user can manually direct the electro-active lenses of the present invention to activate or deactivate. Manual direction can be though voice command or the touching or toggling of a switch as described above.

Another mode of operation can be an on mode. In the on mode or on state, the electro-active spectacles of the present invention can maintain the electro-active lenses of the present invention in an activate state. Accordingly, an off mode can maintain the electro-active lenses of the present invention in a deactivated state.

The ability to program or reprogram the electronic module 202 enables the electro-active spectacles of the present invention to be customized or re-customized for a particular user. Customizable features of the electro-active spectacles of the present invention include any of the following: head tilt angle at which to active one or more electro-active lenses of the present invention; head title angle at which to deactivate one or more electro-active lenses of the present invention; distance between an object viewed by the user and the user at which to activate or deactivate one or more electro-active lenses of the present invention; number of operational modes (e.g., inclusion or exclusion of operational modes such as standby mode or activation mode or off mode); method of toggling between selected operational modes (e.g., selection of which mechanism described above to use to allow a user to toggle between modes including the order of toggling or states); user prescription (e.g., the optical power provided by the electro-active area of the electro-active lenses of the present invention).

Any of the customizable features of the electro-active spectacles of the present invention can be programmed into the electronic module 202 directly (e.g., using a flash programmer or direct wired link) or indirectly (e.g., using a wireless link such as an infrared link or RF link).

The electronic module 202 can include an inductive charge area. That is, the electronic module 202 can include electronics for enabling a power source of the electronic module 202 (or a power source coupled to the electronic module 202) to be recharged inductively by an inductive charging device. The inductive charge area can include inductive charge coils. According to an aspect of the present invention, the inductive charge coils can function as an antenna to communicate with a remote communication device. Communication with a remote communication device can enable remote wireless programming of the electronic module 202 or can enable communication between two or more electronic modules 202 as described above. In general, the inductive charge area can be configured to serve these purposes.

A gyroscope or accelerometer of the electronic module 202 can be used to facilitate activation and deactivation of the associated electro-active lens or lenses based on a head tilt of a user. For example, the gyroscope or accelerometer can activate the associated electro-active lens or lenses when the user's head dips below a first predetermined threshold angle and can deactivate the associated electro-active lens or lenses when the user's head rises above a second predetermined threshold. Additionally, the gyroscope or accelerometer can power down or power off the associated electro-active lens or lenses when the electro-active spectacles housing the electronic module 202 are positioned upside down. For example, a user can power down or power off electro-active spectacles 100 housing the electronic module 202 by simply placing the electro-active spectacles 100 upside down on a relatively flat surface. Alternatively, positioning the electro-active spectacles 100 upside down can place the electro-active spectacles 100 in a standby mode (e.g., a Mode where the electro-active spectacles 100 will not switch between active and deactivate states but otherwise are turned on).

The electronic module 202 can also include or can alternatively include a rangefinder. The rangefinder can be used to facilitate activation and deactivation of the associated electro active lens or lenses based on the distance between a wearer of electro-active spectacles of the present invention and an object the wearer is looking at or observing.

Figure 6:
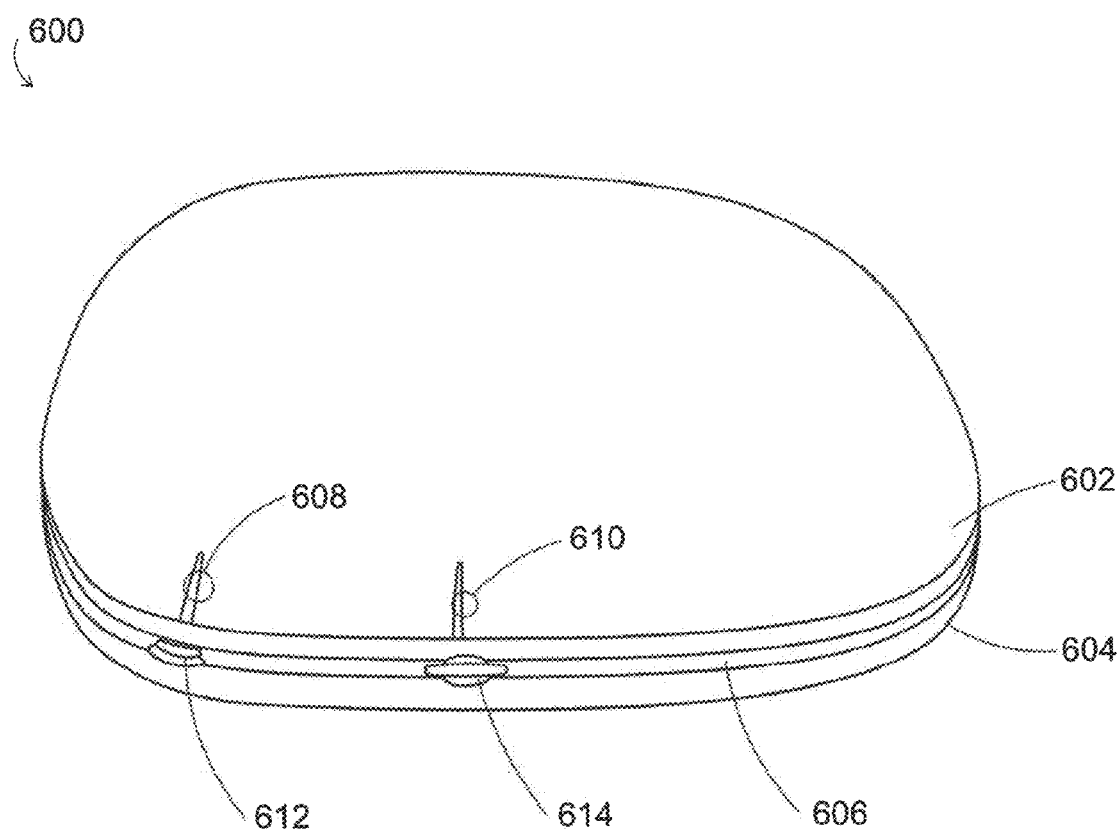
FIG. 6 illustrates an electro-active lens in accordance with an aspect of the present invention.

FIG. 6 illustrates an electro-active lens 600 in accordance with an aspect of the present invention. The electro-active lens 600 can represent one of the electro-active lenses 104 or 106. The electro-active lens 600 is depicted as a finished lens in FIG. 6. That is, the electro-active lens 600 has been edged and grooved to fit into an eyeglass frame.

As shown in FIG. 6, the electro-active lens 600 can comprise a first substrate (e.g., a top substrate) 602 and a second substrate (e.g., a bottom substrate) 604. During an edging process, a groove 606 can be formed (e.g., near or between the interface of the first and second substrates 602 and 604). The groove 606 can be used to position and stabilize the electro-active lens 600 within an eyeglass frame as is done with conventional lenses.

The electro-active lens 600 can comprise a first electrical lead or connector 608 and a second electrical lead or connector 610. The first and second electrical leads 608 and 610 can provide power (e.g., a drive signal or a control signal) to the electro-active region of the electro-active lens 600. In particular, the first and second electrical leads 608 and 610 can link or connect the electro-active region of the electro active lens 600 to a power source and electronic components that can be housed within an associated eyeglass frame (e.g., the electronic module/control unit 202 depicted in FIG. 5). The first and second electrical leads 608 and 610 can comprise any conductive material including, but not limited to, silver ink. The first and second electrical leads 608 and 610 can be painted, applied or otherwise deposited onto the transparent conductive layers placed on the substrates 602 and 604.

To ensure or improve connectivity, after edging and grooving the electro-active lens 600, a small quantity of conductive material, paint or paste can be placed on top of the first and second electrical leads 608 and 610. Specifically, as shown in FIG. 6, a first conductive material 612 can be placed in the groove 604 on top of the first electrical lead 608 and a second conductive material 614 can be placed in the groove 604 on top of the second electrical lead 610. The first and second conductive materials 612 and 614 can be substantially transparent and can comprise an indium tin oxide (ITO) paste or a paint containing silver particles (e.g., silver ink).

Figure 7:
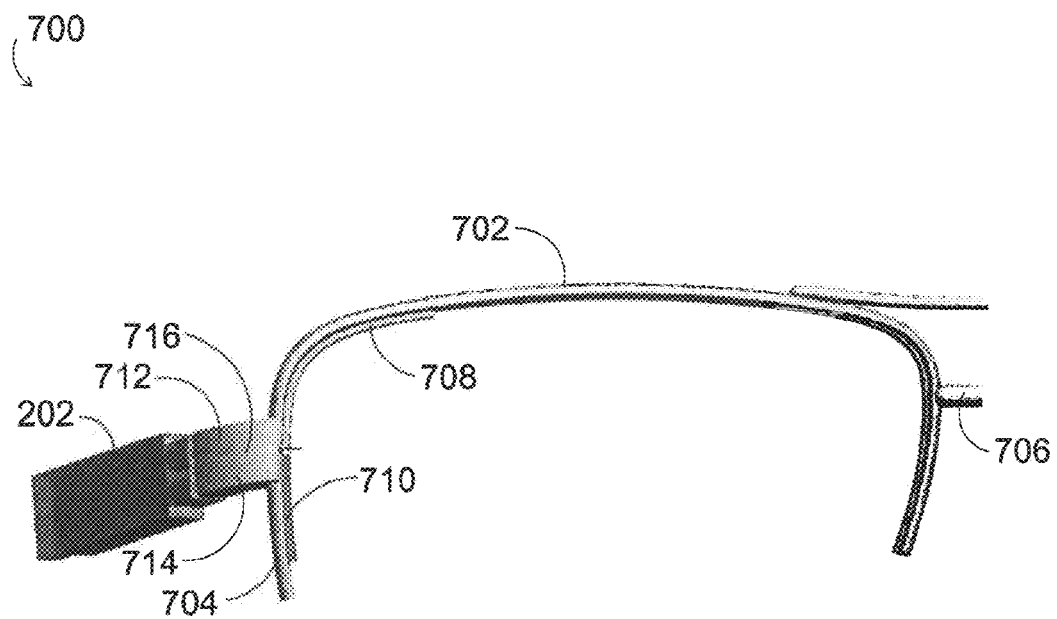
FIG. 7 illustrates a portion of a frame in accordance with an aspect of the present invention.

FIG. 7 illustrates a portion of a frame 700 in accordance with an aspect of the present invention. The frame 700 can provide electrical connectivity between the electro-active lenses (not depicted in FIG. 7 for simplicity) and the electrical components used to operate electro-active lenses.

The frame 700 can include an upper portion of the right eye-wire or rim 702 and a lower portion of the right eye-wire or rim 704. For a fully rimmed frame, the lower portion 704 can extend underneath an electro-active lens to a bridge 706. For a partially-rimmed frame, the lower portion 704 generally does not extend to the bridge 706.

The frame 700 can include an electronic module 202 and an area to accept an electronic module 202. A first conductor 708 can be positioned within a groove of the upper rim portion 702. A second conductor 710 can be positioned within a groove of the lower rim portion 704. The first and second conductors 70$ and 710 can comprise flexible, compressible materials. When an electro-active lens—e.g., the electro-active lens 600 depicted in FIG. 6—is positioned within the frame 700, the first and second conductors 708 and 710 can be compressed to fit in the groove of the upper and lower rim portions 708 and 710, respectively, and the groove 606 of the electro-active lens 600. The first conductor 708 can be positioned to make contact with the first conductive material 612. The second conductor 710 can be positioned to make contact with the second conductive material 614.

The frame 700 can include an upper conducting member 712, a lower conducting member 714 and an insulating or isolation member 716. The upper conducting member 712, the lower conducting member 714 and the insulating member 716 can physically couple the temple of the frame 700 to the eye-wire portion (i.e., the upper and lower rim portions 702 and 704).

The upper conducting member 712 can provide connectivity between the electronic module 202 and the first conductor 708. The first conductor 708 can provide connectivity to the first conductive material 612 (and, as a result, connectivity to the first electrical lead 608) depicted in FIG. 6. The lower conducting member can provide connectivity between the electronic module 202 and the second conductor 710. The second conductor 710 can provide connectivity to the second conductive material 614 (and, as a result, connectivity to the second electrical lead 610) depicted in FIG. 6. The insulating member 716 can ensure that the connectivity path between the electronic module 202, the upper conducting member 712 and the first conductor 708 remains insulated or electrically separated from the connectivity path between the electronic module 202, the lower conducting member 714 and the second conductor 710.

Any portion of the upper conducting member 712 and the lower conducting member 714 can provide a conductive link. As an example, the entirety of the upper and lower conducting members 712 and 714 can be conductive (e.g., made of metal and coated with a nonconductive material) or a portion of the upper and lower conducting members 712 and 714 can be conductive (e.g., an internal portion that is encapsulated by non-conductive material).

Figure 8:
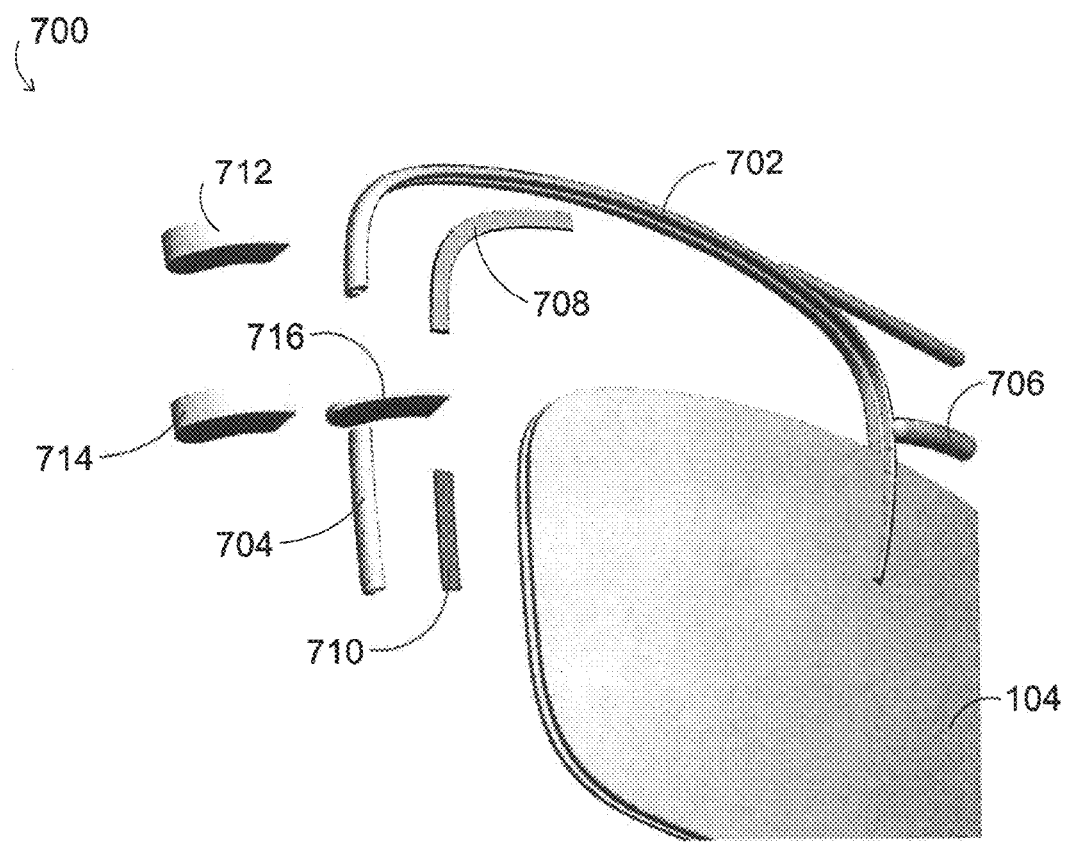
FIG. 8 illustrates an exploded view of the frame depicted in FIG. 7 in accordance with an aspect of the present invention.

FIG. 8 illustrates an exploded view of the frame 700 depicted in FIG. 7. As shown in FIG. 8, the frame 700 can be assembled by connecting the upper conducting member 712, the insulating member 715 and the lower conducting member 714 to the upper rim portion 702 and the lower rim portion 704. The first conductor 708 and the second conductor 710 can then be positioned in the groove of the upper rim portion 702 and the lower rim portion 704, respectively. The first and second conductors 708 and 710 can be positioned in arias where they will make contact with the first conductive material 612 and the second conductive material 614, respectively.

The components illustrated in FIGS. 7 and 8—namely, the upper conducting member 712, the lower conducting member 714, the insulating member 716, the upper rim portion 702, the lower rim portion 704, the first conductor 708 and the second conductor 710—can be used to form a portion of the frame 700 as a partially-rimmed frame or a fully-rimmed frame and to provide connectivity between an electronic module of the present invention and an electro-active lens of the present invention for each type of frame (and a variety of styles therein).

For a fully-rimmed frame, both the upper rim portion 702 and the lower rim portion 704 can extend from the upper conducting member 712 and the lower conducting member 714, respectively, to the bridge 706. For a partially-rimmed frame, generally only the upper rim portion 702 extends from the upper conducting member 712 to the bridge 706 while the lower rim portion 704 does not extend to the bridge 706.

When the frame 700 is implemented as a fully-rimmed frame or a partially-rimmed, the first conductor 708 can be of any size or length. That is, the first conductor 708 can extend along any portion of the upper rim 702 to make electrical connectivity with a desired lead of the electro-active lens 104, When the frame 700 is implemented as a fully-rimmed frame, the second conductor 710 can similarly be of any size or length to make electrical connectivity with a separate or second desired lead of the electro-active lens 104. However, when the frame 700 is implemented as a partially-rimmed frame, the second conductor 710 will be of the same length or shorter than the lower rim portion 704.

Figure 9:
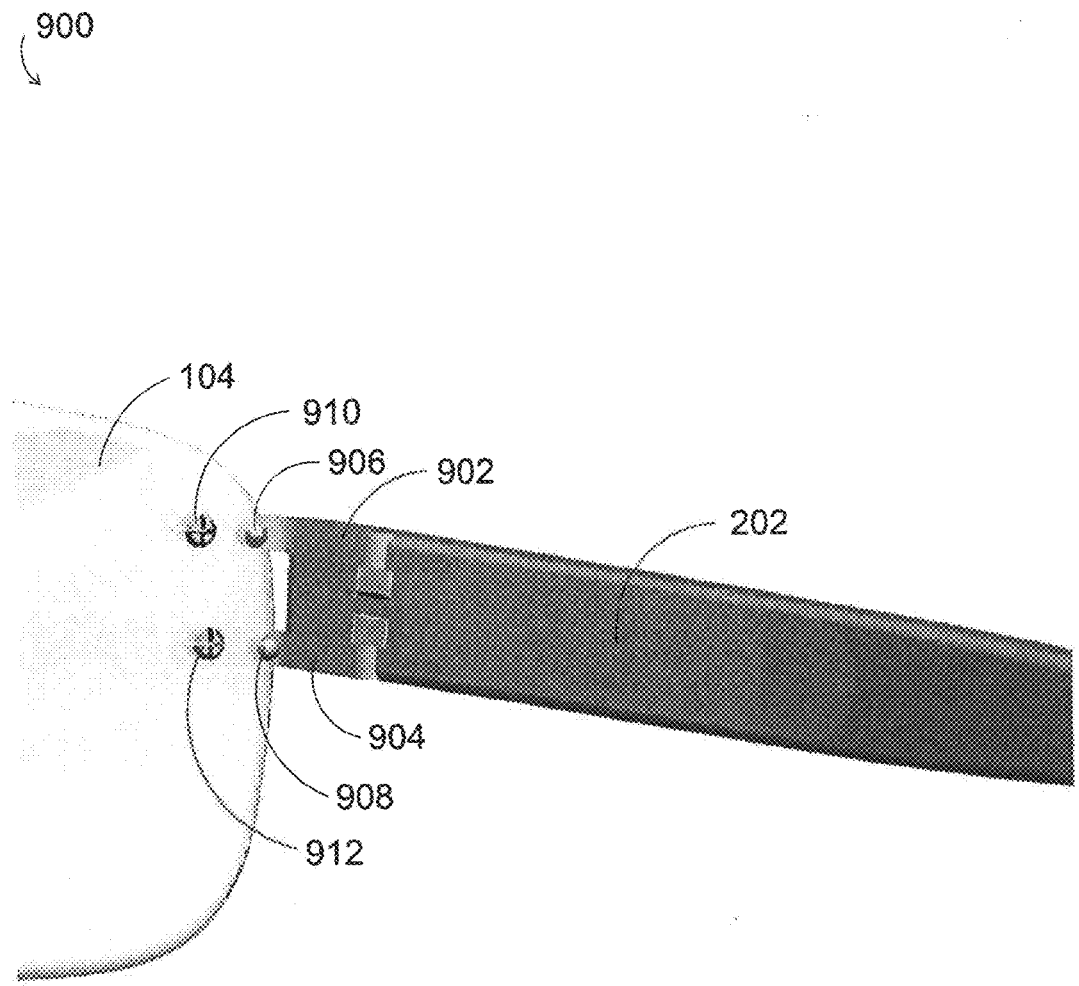
FIG. 9 illustrates a portion of electro active spectacles in accordance with an aspect of the present invention.

FIG. 9 illustrates a portion of electro-active spectacles 900 in accordance with an aspect of the present invention. The electro-active spectacles 900 are implemented as rimless spectacles. That is, no upper or lower rim supports the electro active lens 104.

As shown in FIG. 9, the electro-active spectacles 900 can include an electronic module 202 and an area to accept an electronic module 202. The electronic module 202 can be electrically coupled to the electro-active lens 104 using upper conducting member 902 and lower conducting member 904 (similar to upper conducting member 712 and lower conducting member 714 depicted in FIGS. 7 and 8). Both the upper and lower conducting members 902 and 904 can be isolated or insulated conductors having a protected, internal conductive routes (e.g., a conductive wire) enclosed by a non-conductive material (e.g., a plastic). Alternatively, the upper and lower conducting members 902 and 904 can entirely The frame of the electro active spectacles 900 can support the electro-active lens 104 using upper support member 910 and lower support member 912. As an alternative, one of the upper and lower support members 910 and 912 can be used. Both the upper and lower supporting members 910 and 912 can be positioned through holes residing in the electro-active lens 104. The frame of the electro-active spectacles 900 can also be supported by upper contact 906 and lower contact 908. Both the upper and lower contacts 906 and 908 can be positioned through holes residing in the electro-active lens 104. The upper and lower contacts 906 and 908 can be compression pin connectors having a portion that can make electrical contact with appropriate elements of the electro-active lens 104.

While simultaneously supporting the electro-active lens 104, the upper contact 906 can make electrical contact with a first electrical lead of the electro-active lens (e.g., the first electrical lead 608 depicted in FIG. 6). Similarly, the lower contact 908 can support the electro active lens 104 while also providing electrical contact to a second electrical lead of the electro-active lens (e.g., the second electrical lead 610 depicted in FIG. 6).

Both the upper contact 906 and the upper support member 910 can form part of an arm or extension of the upper conducting member 902. The upper contact 906 and the upper support member 910 can comprise one or more conductors (e.g., a wire) insulated or contained by an insulating material (e.g., plastic). The upper contact 906 and the upper support member 910 can be positioned in front of the electro-active lens 104 (and connect through to the back of the electro-active lens 104—as shown in FIG. 9) or can be positioned behind the electro-active lens 104 (and connect through to the front of the electro-active lens 104—not shorn in FIG. 9). The lower contact 908 and the lower support member 912 can be positioned in a manner similar to the upper contact 906 and the upper support member 910 pairing (and can form part of an arm or extension of the upper conducting member 904).

Figure 10:
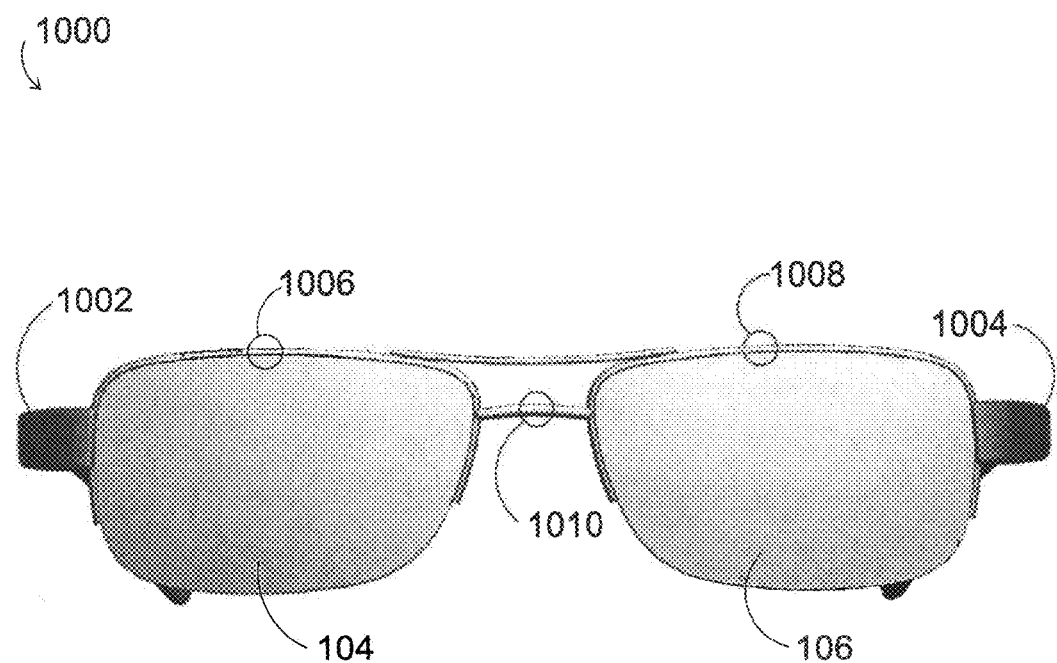
FIG. 10 illustrates a front a view of electro-active spectacles in accordance with an aspect of the present invention.

FIG. 10 illustrates a front a view of electro-active spectacles 1000 in accordance with an aspect of the present invention. The electro-active spectacles 1000 are implemented as partially-rimmed spectacles. Electrical connectivity between a right side of the electro-active spectacles (e.g., from a right-side portion of a frame 1002) to a left side of the electro-active spectacles (e.g., from a left-side portion of a frame 1004) can be provided in a variety of Ways and is not limited to partially-rimmed designs. Electrical connectivity between the right-side portion 1002 and the left-hand portion 1004 can enable a single electronic module (e.g., the electronic module 202) located on either side to govern operation of both electro-active lenses 104 and 106. Further, this connectivity can ensure synchronized operation of the electro-active lenses 104 and 106 even if each of the electro-active lenses 104 and 106 is driven by separate electronic modules.

One or more conducting elements (e.g., conducting wires) Can be embedded in a right-side upper frame or rim member 1006, a left-side upper frame or rim member 1008 and a bridge 1010 (as well as a left-side lower frame or rim member and a right-side lower frame or rim member for some frame designs). The conducting elements can be embedded and surrounded by insulating material. Embedding one or more conducting elements in the right-side upper frame member 1006, the bridge 1010 and the left-side upper frame member 1008 can enable an electronic module on either side of the electro-active spectacles 1000 to control and/or synchronize operation of both electro-active lenses 104 and 106.

Rimless frames generally do not include the right-side upper frame member 1006 or the left-side upper frame member 1008, Rimless frames, however, do generally Maude a bridge 1010. Electrical connectively between the right-side portion 1002 and the left-hand portion 1004 of a rimless frame can be accomplished by using conductive elements incorporated into the manufacture of the electro-active lenses 104 and 106. Specifically, the bridge 1010 can electrically connect (e.g., using an embedded conductive link or a conductive link adjacent to or connected to the bridge) one or more conducting elements of the electro-active lenses 104 and 106 (e.g., using one or more ITO layers) which are themselves coupled to the right-side portion 1002 and the left-hand portion 1004, respectively, of a spectacles lens. Electrical connectively between the right-side portion 1002 and the left-hand portion 1004 of a rimless frame can also be accomplished by using conductive wires positioned within the grooves an electro-active lens (e.g., the groove 606 depicted in FIG. 6) to couple the right-side portion 1002 to the left-hand portion 1004. Portions of the groove on the top part of the electro-active lens or on the bottom part of the electro-active lens can be used to house or contain one or more conductive wires. The conductive wires positioned within such a groove can be insulated.

According to an aspect of the present invention, one or more conductive wires can be embedded in the upper rim connectors, the bridge and/or the lower rim connectors of electro-active spectacles and frames of the present invention during a mold casting process. That is, when the upper rim connectors, the bridge and/or the lower rim connectors are formed using a casting process, one or More conductive wires can be cast over when the upper rim connectors, the bridge and/or the lower rim connectors are prepared. Generally, thicker conductive wires can be used during such a process. Nylon is an example Material that can be used to mold over one or more conductive wires to from the upper rim connectors, the bridge and/or the lower rim connectors.

According to an aspect of the present invention, one or more conductive wires can be embedded in the upper rim connectors, the bridge and/or the lower rim connectors of electro-active spectacles and frames of the present invention as each frame component is assembled. More specifically, any of the upper rim connectors, the bridge and/or the lower rim connectors that will be used to embed one or more conductive wires can be fabricated by two or more individual or separate pieces. For example, the upper rim connectors can be formed from two substantially symmetrical pieces of substantially the same shape—a front piece and a back piece which individually may appear to be a portion of the upper rim connector split in half lengthwise. Prior to assembling the front and back pieces to form a complete Upper rim connector, one or more wires can be embedded (e.g., in a groove formed by mold or machined into the front and/or back pieces) between the front and back pieces (i.e., at the interface between the front and back pieces). The front and back pieces used to form the complete upper rim connector can subsequently be combined, for example, using an adhesive.

According to an aspect of the present invention, one or more conductive wires can be embedded in the upper rim connectors, the bridge and/or the lower rim connectors of electro-active spectacles and frames of the present invention after the frame is assembled. Specifically, one or more grooves can be machined into the upper rim connectors, the bridge and/or the lower rim connectors that can be used to contain one or more conductive wires. The machined grooves can then be filled or covered with material to cosmetically hide the conductive wires. The assembled frame can then be polished to hide or mask the area in which the wires are embedded. Acetate is an example material that can be manipulated in this fashion to embed one or more conductive wires.

Figure 17:
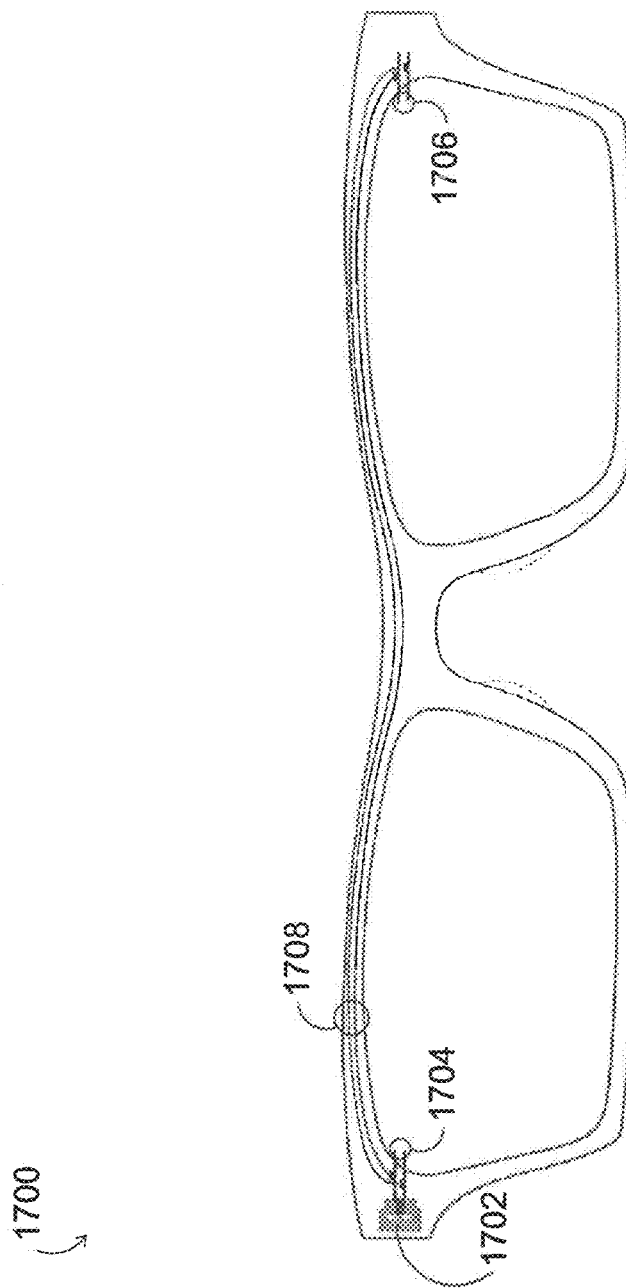
FIG. 17 illustrates an electro-active frame in accordance with an aspect of the present invention.

FIG. 17 illustrates electro-active frame 1700 in accordance with an aspect of the present invention, Electro-active lenses can be mounted within the electro active frame 1700. For simplicity, a portion of electronics 1702 that can be used to govern operation of the electro-active lenses are shown. The electronics 1702 can represent a portion of an electronic module 202 described above and/or can represent conductive elements positioned to provide electrical connectivity between a temple of the electro-active frame 1700 and a front portion of the electro-active frame 1700. The electro-active frame 1700 is shown as including electronics 1702 on only one side of the electro-frame 1700 but is not so limited.

As further shown in FIG. 17, the electro-active frame 1700 can include conductive leads 1704 and 1706 and conductive link 1708. Conductive link 1708 can provide electrical connectivity from one side of the electro-active, frame 1700 to the other side of the electro-active frame 1700. Conductive leads 1704 can provide electrical connectivity between electronics 1702 and a first electro-active lens mounted within the electro-active frame 1700. Conductive leads 1706 can provide electrical connectivity between the conductive link 1708 and a second electro-active lens mounted within the electro-active frame 1700.

As shown in FIG. 17, the conductive link 1708 can be embedded or positioned within the electro-active frame 1700. The conductive link 1708 can include any number of conductive elements (e.g., wires) that can be insulated not insulated. If the electro-active frame 1700 uses driver electronics on each side of the frame 1700 (e.g., a master and slave driver electronics or electronic modules 202) then as few as only one single wire can comprise the conductive link 1708). If the electro-active frame 1700 has driver electronics on only one side of the electro-active frame 1700, then at least two wires or conductive elements can be used. The conductive link 1708 can be positioned inside the electro-active frame 1700 in accordance with any of the methods described above for embedding conductive links including, but not limited to, (1) embedding during a mold casting process; (2) embedding during an assembly process of the front frame portion of the electro-active frames 1700; and (3) embedding after assembly of the electro-active frames by providing a groove or route for the conductive link 1708. The conductive link 1708 can also use or can alternatively comprise the conductive layers of the electro-active lenses of the present invention that can be positioned into the frames 1700 as described above.

FIG. 18 illustrates electro-active spectacles 1800 in accordance with an aspect of the present invention. The electro-active spectacles 1800 can include an electronic module 202. The electro-active spectacles 1800 can also include conductive link 1802. Conductive link 1802 can include any number of conductive elements (e.g., wires) that can be insulated or not insulated, Conductive link 1802 can provide electrical connectivity between the electronic module 202 and the electro-active lens 104 and the electro-active lens 106.

As shown in FIG. 18, a portion of the conductive link 1802 can be positioned or embedded within a portion of the frame of the electro-active spectacles 1800. For rimless spectacles, the conductive link 1802 can be routed through a groove in an electro-active lens (e.g., the groove 606 depicted in FIG. 6). As further shown in FIG. 18, the conductive link 1802 can be routed adjacent to a bridge 1804 of the electro-active spectacles 1800. For example, the conductive link can be routed through tubing 1806 that is positioned adjacent to the bridge 1804.

Figure 11:
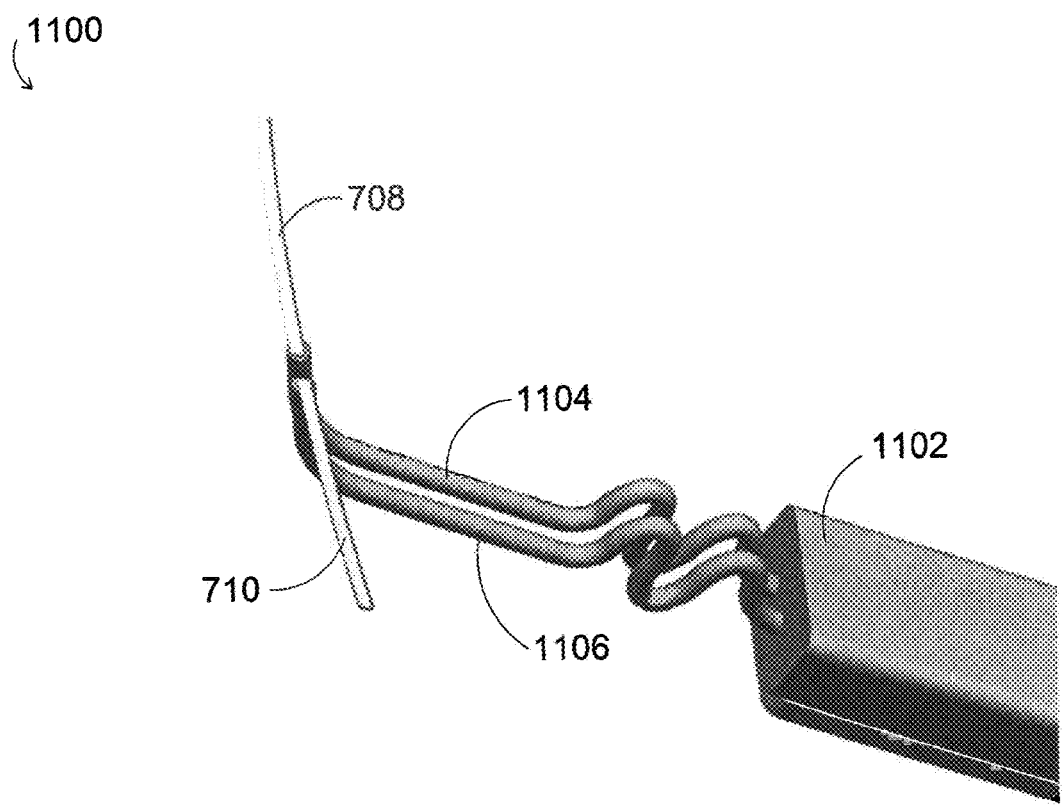
FIG. 11 illustrates a portion of a right temple of electro active spectacles in accordance with an aspect of the present invention.

FIG. 11 illustrates a portion of a right temple 1100 of electro-active spectacles in accordance with an aspect of the present invention. The portion of the right temple 1100 depicted in FIG. 11 shows a right temple area 1102 that can be coupled to an electro-active lens (not depicted in FIG. 11 for simplicity). The right temple area 1102 can include an electro-active module of the present invention. The right temple area 1102 can be coupled to the first conductor 708 through first conductor link 1104. The right temple area 1102 can further be coupled to the second conductor 710 through a second conductor link 1106.

The first and second link conductors 1104 and 1106 can be shaped and constructed to tolerate bending of the frame (not depicted in FIG. 11 for simplicity) when the electro-active spectacles are opened and closed. The first and second link conductors 1104 and 1106 can contain one or more conducting elements (e.g., conducting wires) and can enclose them with insulating or non-conductive material or can themselves be entirely conductive. The first and second link conductors 1104 and 1106 can be considered to be continuous conductive links since they provide an uninterruptable physical connection between the right temple area 1102 and the conductive elements of the electro-active lenses (e.g., to conductive elements 708 and 710).

Figure 12:
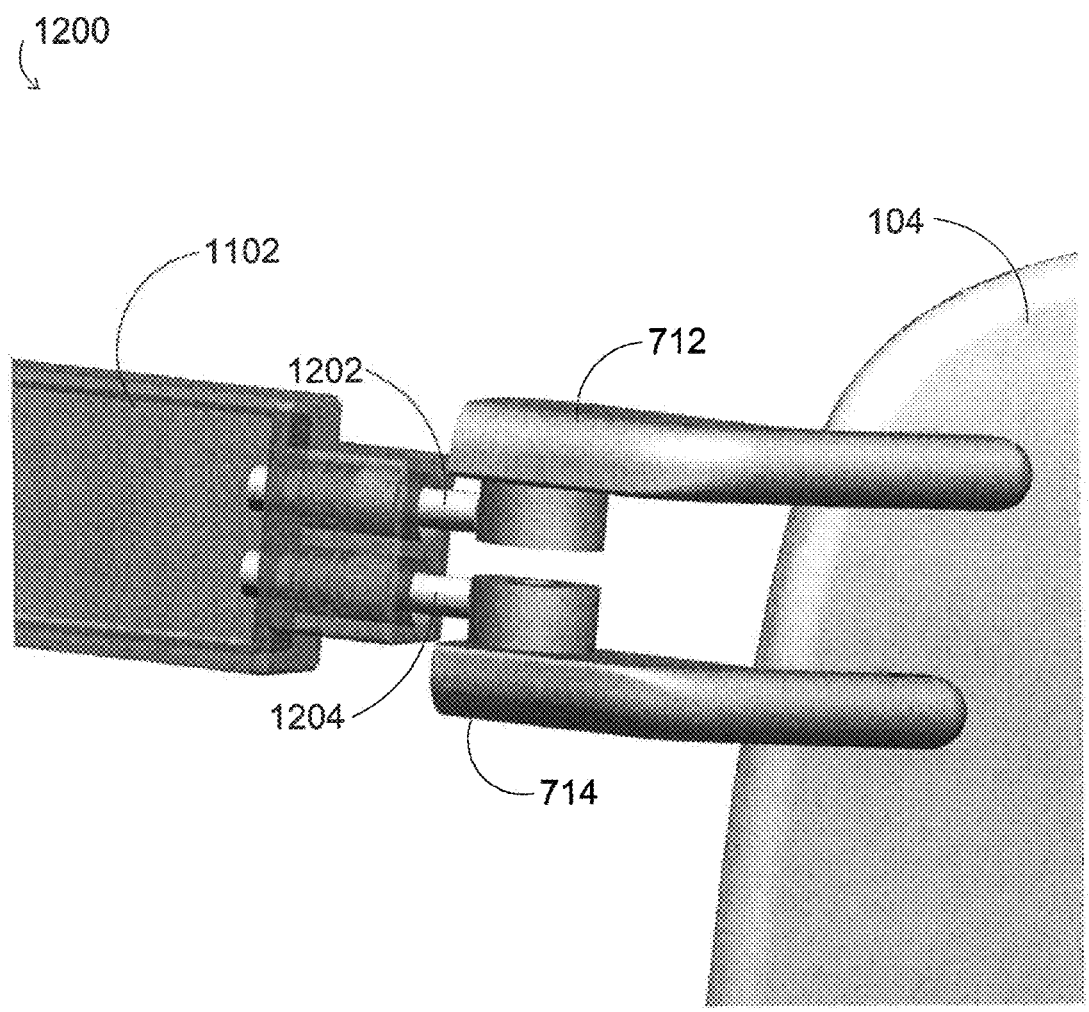
FIG. 12 illustrates a portion of a right temple of electro-active spectacles in accordance with an aspect of the present invention.

FIG. 12 illustrates a portion of a right temple 1200 of electro-active spectacles (implemented as rimless spectacles) in accordance with an aspect of the present invention. The portion of the right temple 1200 depicted in FIG. 12 shows a right temple area 1102 that can be coupled to an electro-active lens (not depicted in FIG. 11 for simplicity). The right temple area 1102 can include an electro-active module of the present invention. The right temple area 1102 can be Coupled to the upper Conducting member 712 through a first spring conductor 1202. The right temple area 1102 can further be coupled to the lower conducting 714 through a second spring conductor 1204. The first and second spring conductors 1202 and 1204 can contain one or more conducting elements (e.g., conducting wires) and can enclose them with insulating or non-conductive material or can themselves be entirely conductive. The first and second spring conductors 1202 and 1204 can be considered to be discontinuous conductive links since they can provide an interruptible physical connection between the right temple area 1102 and the conductive elements of the electro-active lenses (to upper and lower conducting members 712 and 714).

The first and second spring conductors 1202 and 1204 can extend proud of the right temple portion 1102 when the spectacles are in use (i.e., when they are opened). The first and second spring conductors 1202 and 1204 can retract inside the right temple portion 1102 when the spectacles are not in use (i.e., when they are closed). When opened, the first and second spring conductors 1202 and 1204 can extend to make contact with the upper and lower conducting members 712 and 714, respectively.

The connectivity mechanisms illustrated in FIGS. 11 and 12 and described above can be used for any type of frame style—that is, for fully rimmed, partially-rimmed and rimless frames of the present invention. Further, according to an aspect of the present invention, the first and second spring conductors 1202 and 1204 can be used to activate, deactivate, or place electro-active spectacles of the present invention into a standby mode or off mode of operation. For example, when the spring conductors 1202 and 1204 are not coupled or in contact with the upper and lower conducting members 712 and 714, the electro-active spectacles of the present invention can be powered-off or placed into a standby mode. When the spring conductors 1202 and 1204 are coupled or in contact with the upper and lower conducting members 712 and 714, the electro-active spectacles of the present invention can be powered-on and placed into an active mode (e.g., a switchable mode based on sensed input) or can immediately activate the electro-active lenses.

As will be apparent to one skirled in the pertinent art, electronics housed within the frame can sense such a lens disconnect condition by observing a reduction in capacitance or change in drive signal waveform that can occur when the spring conductors 1202 and 1204 are not coupled or in contact with the upper and lower conducting members 712 and 714. Once in the lens disconnect state, the electronics of the electro-active spectacles of the present invention can transition into a low power, standby or off mode. When in a low power or standby mode, the electronics of the electro-active spectacles of the present invention can periodically or randomly observe sensed capacitance or changes in the drive signal waveform to detect when the frame is re-opened for use.

Figure 13:
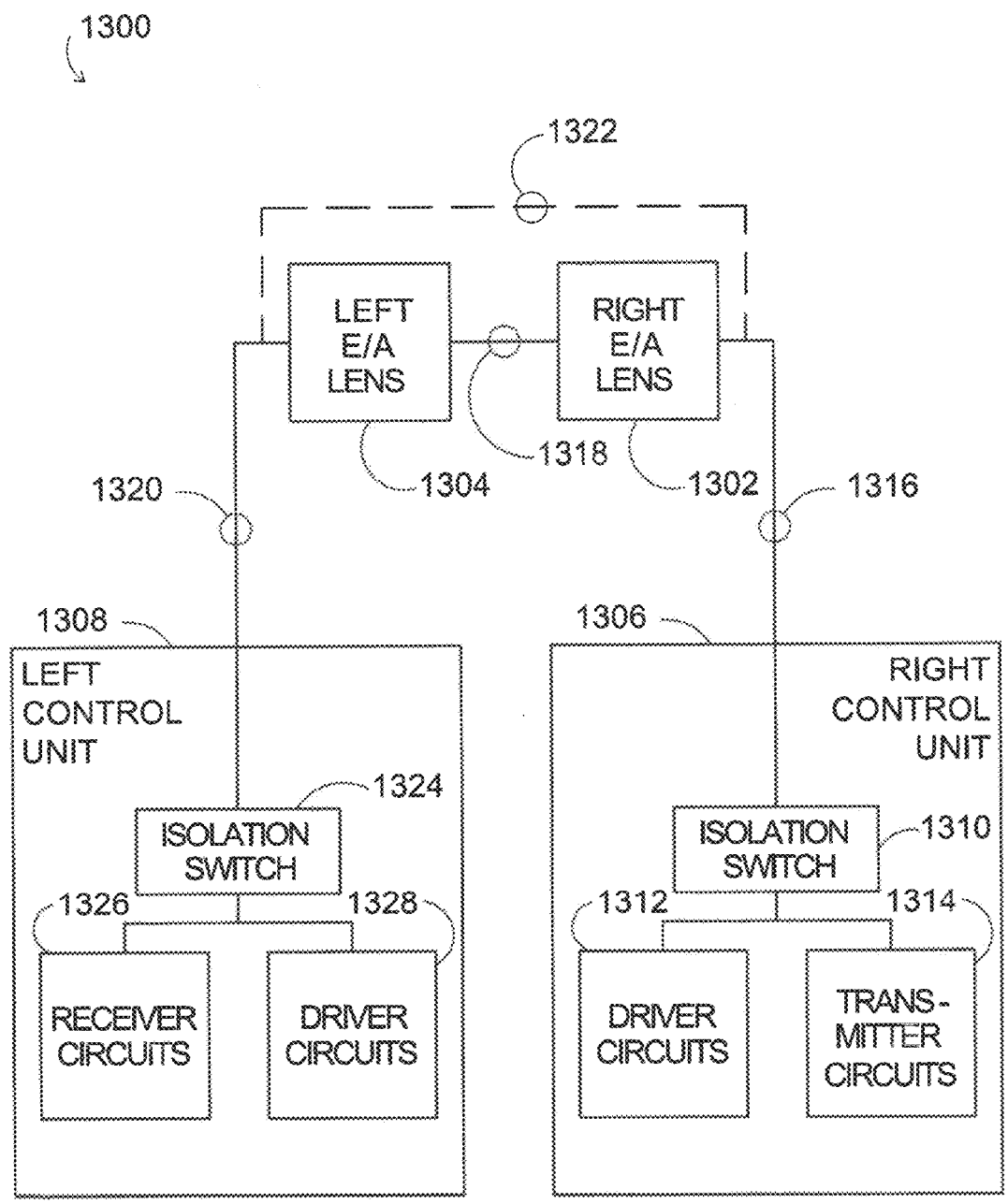
FIG. 13 illustrates a representative block diagram of electro-active spectacles in accordance with an aspect of the present invention.

FIG. 13 illustrates a representative block diagram of electro-active spectacles 1300 in accordance with an aspect of the present invention. The electro-active spectacles 1300 can represent the electro-active spectacles of the present invention described above the electro-active spectacles 100). The electro-active spectacles 1300 can include a right electro-active lens 1302 and a left electro-active lens 1304. The right and left electro-active lenses 1302 and 1304 can represent the first and second electro-active lenses 104 and 106 described earlier. The electro-active spectacles 1300 can include a right control unit 1306 and a left control Unit 1308. The left and right control units 1306 and 1308 can each represent an electronic module 202, or a portion thereof, described above.

The right control unit 1306 can include an isolation switch 1310, driver circuits 1312, and transmitter circuits 1314. The driver circuits 1312 can generate a driver signal for operating (e.g., activating) the right electro-active lens 1302. For example, to activate the right electro-active lens 1302, the driver circuits 1312 can provide, generate or transmit a driver signal or activation signal. Further, to deactivate the right electro-active lens 1302, the driver circuits 1312 can simply stop providing, generating or transmitting the driver signal.

The transmitter circuits 1314 can generate a synchronization signal for coordinating operation of the right and left electro-active lenses 1302 and 1304. Specifically, the transmitter circuits 1314 can transmit a synchronization signal instructing the left electro-active lens 1304 to activate or deactivate. As an example, the left electro-active lens 1304 can be activated based on receipt of the synchronization signal or a synchronization signal of a first type instructing activation. Further, the left electro-active lens can be deactivated based on the absence of the synchronization signal or receipt of a synchronization signal of a second type instructing deactivation, As a result, the right and left electro-active lenses 1302 and 1304 can be activated and deactivated at substantially the same time.

The isolation switch 1310 can determine when the driver circuits 1312 and the transmitter circuits 1314 can access a conductive link 1316 coupling the right electro-active lens 1302 to the control unit 1306. The conductive link 1316 can comprise one or More conductive wires. The conductive link 1316 can represent one or more of the connectivity mechanisms depicted and described above (e.g., the routing and connectivity features illustrated in FIGS. 11 and 12 and described above).

When the electro-active spectacles are implemented with only a single control unit (e.g., the control unit 1306), then the control unit 1306 can control operation of both the right and the left electro-active lenses 1302 and 1304. Under such a scenario, the isolation switch 1310 and transmitter circuits 1314 can be optional. Further, the left and right electro-active lenses 1302 and 1304 can be activated at substantially the same time by a driver signal provided by the driver circuits 1312.

A communications link between the right and left control units 1306 and 1308 can comprise any portion of the conducive link 1316, conductive elements within the right electro-active lens 1302, a bridge conductive link 1318 contained within or adjacent to a bridge of the electro-active spectacles 1300, conductive elements within the left electro-active lens 1304, and a conductive link 1320. The conductive link 1320 can comprise one or more conductive wires and can represent one or more of the connectivity mechanism depicted and described above (e.g., the routing and connectivity features illustrated in FIGS. 11 and 12 and described above). The communications link between the right and left control units 1306 and 1308 can also include or alternatively include a frame conductive link 1222 (shown in phantom in FIG. 13).

The frame conductive link 1322 can include one or more conductive wires wrapped over the right and left electro-active lens 1302 and 1304—e.g., either embedded within a portion of the frame and/or contained in a groove of the right and left electro active lenses 1302 and 1304 as described above. The frame conductive link 1322 can also include conductive elements of the right and left electro-active lenses 1302 and 1304 (e.g., one Or more layers of no or other transparent conductive layers of the right and left electro-active lenses 1302 and 1304). For example, the frame conductive link 1322 can be a wireless link that uses conductive layers of the right and left electro-active lenses 1302 and 1304 as antennas to facilitate communication and/or synchronization between the right and left electro-active lenses 1302 and 1304. Alternatively, other conductive elements can be embedded within the electro-active, spectacles of the present invention to facilitate communication and/or synchronization between the right and left electro-active lenses 1302 and 1304. One or more of these embedded antennas could also provide a wireless communication link between the electro-active spectacles of the present invention and a remote communication device.

Overall, the right control unit 1306 can communicate with the left control unit 1308 and/or can operate the left electro active lens 1304 using a single conductive wire or link. The single conductive wire can also be used to operate the right electro-active lens 1302. The single conductive wire or link can be embedded within a portion of a frame and can include conductive elements of the electro-active lenses.

The left control unit 1308 can include an isolation switch 1324, driver circuits 1326, and receiver circuits 1328. The driver circuits 1326 can generate a driver signal for operating (e.g., activating) the left electro-active lens 1302. The receiver circuits 1326 can receive and process a synchronization signal transmitted by the right electro-active module 1306. The isolation switch 1324 can determine when the driver circuits 1312 and the receiver circuits 1328 can access the conductive link 1320 coupling the left electro active lens 1304 to the control unit 1308.

The receiver circuits 1326 can listen for a synchronization signal transmitted over conductive link 1320. The receiver circuits 1326 can listen periodically or randomly for a specific or random amount of time. Once a synchronization signal is received, the control unit 1308 can operate accordingly—i.e., either activate or deactivate the left electro-active lens 1304 using a driver signal transmitted by the driver circuits 1328.

The transmitter circuits 1314 can transmit a synchronization signal in response to detection of a head tilt change of the user (e.g., detected by a gyroscope or accelerometer included in the right control unit 1306—not illustrated for clarity) or manual command issued by the user. The synchronization signal transmitted by the transmitter circuits 1314 can be Coded to distinguish it from noise and to prevent false triggering.

Figure 14:
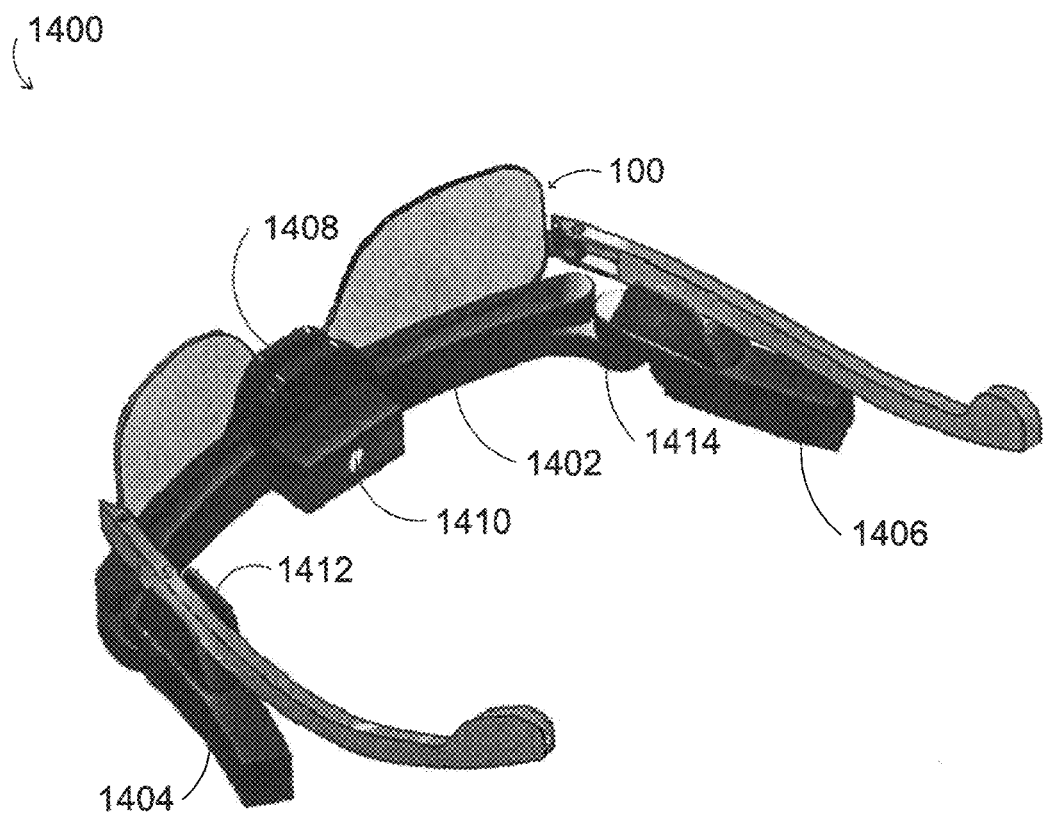
FIG. 14 illustrates a slim line charger in accordance with an aspect of the present invention.

FIG. 14 illustrates an electro active spectacles charger 1400 in accordance with an aspect of the present invention. The charger 1400 (as a slim line charger) can be used to charge/re-charge electro active spectacles (e.g., the electro-active eyeglasses 100) of the present invention.

As shown in FIG. 14, the slim line charger 1400 comprises a front member or base member 1402, a first movable arm 1404, and a second movable arm 1406. The front member 1402 can include a raised support member 1408 and a charging state indicator 1410. The charging state indicator 1410 can be a light emitting diode (LED). The first arm 1404 can include a first adjustable charging area 1412 (or first adjustable inductive charging cradle) and the second arm 1406 can include a second adjustable charging area 1414 (or second adjustable inductive charging cradle).

The base member 1402 can support a front portion of the electro-active spectacles 100 (e.g., the first and second electro-active lenses 104 and 106 and any surrounding frame rim portions). The raised support member 1408 can support a bridge area of the electro-active spectacles 100. Alternatively, or in addition thereto, the raised support member 1408 can support one or more electro-active lenses or rim portions of the electro-active spectacles 100.

The first arm 1404 can be moveable, Specifically, the first arm 1404 can rotate to an open position from a closed positioned about a point where the first arm 1404 is attached to the front member 1402. The first arm 1404 is depicted in an open position in FIG. 14. In a closed position, the first arm 1404 can be adjacent and parallel to the first member 1402. Similar to the first arm 1404, the second arm 1406 can also be moveable. Specifically, the second arm 1406 can rotate to an open position from a closed positioned about a point where the second arm 1406 is attached to the front member 1402. The second arm 1406 is depicted in an open position in FIG. 14. In a closed position, the second arm 1406 can be adjacent and parallel to the first member 1402.

The first adjustable charging cradle 1412 can be moved along the first arm 1404. As an example, the first adjustable charging cradle 1412 can be held into position using a set screw and can be moved along a groove positioned in the first arm 1404. The first charging area 1412 can be adjusted to be located near or next to a charging area of the electro-active spectacles 100. The first charging area 1412 can include an indicative charger to inductively charge an inductive charging region of the electro-active spectacles 100. As an example, the electro-active spectacles 100 can include an inductive charger region within an electronic module as described above. To recharge the electro-active spectacles 100, the first adjustable charging area 1412 can be positioned to be in close proximity the inductive charging region of the electro-active spectacles 100.

Correspondingly, the second adjustable charging cradle 1414 can be moved along the second arm 1406. As an example, the second adjustable. charging cradle 1414 can be held into position using a set screw and can be moved along a groove positioned in the second arm 1406. The second charging area 1414 can be adjusted to be located near or next to a charging area of the electro-active spectacles 100. The second charging area 1414 can include an inductive charger to inductively charge an inductive, charging region of the electro-active spectacles 100. To recharge the electro-active spectacles 100, the second adjustable charging area 1414 can be positioned to be in close proximity with the inductive charging region of the electro-active spectacles 100.

As shown in FIG. 14, the slim line charger 1400 can be used to recharge two electronic modules. The slim line charger 1400 can also be used to charge electro-active spectacles 100 having a single electronic module. By allowing the first and second adjustable charging areas 1412 and 1414 to move, the slim line charger 1400 can be used to recharge a wide variety of frame sizes and styles. That is, since frames sizes may vary for different users, the recharging area of the frames may be located in different positions relative to the front member 1402. Accordingly, the first and second adjustable charging areas 1412 and 1414 can be moved to line up or be close to these charging areas. Overall, the slim line charger 1400 can support any frame type—fully-rimmed, partially-rimmed and rimless—and any frame size or shape.

As an alternative to inductive charging, the charger 1400 can be used to charge electro-active spectacles directly. That is, the charger 1400 can include a conductive link that can be used to plug into electro-active spectacles to transfer power directly rather than inductively.

The charging state indicator 1410 can change states to indicate a change in the charging status of the electro-active spectacles 100. For example, the charging state indicator 1410 can have a first state to indicate the charger 1400 is not charging (e.g., an off state), a second state to indicate the charger 1400 is recharging the electro-active spectacles 100 (e.g., a charging state), and a third state to indicate the charger 1400 has completed or fully recharged the electro-active spectacles 100 (e.g., a charged or completed state). The slim line charger 1400 can include a rechargeable power supply to enable charging of electro-active spectacles 100 when the charger is not connected to a power supply source (e.g., a wall outlet) directly. The slim line charger 1400 can include a port to connect the charger 1400 to a power supply (e.g., a wall outlet). The slim line charger 1400 can therefore charge the electro-active spectacles 100 when either plugged into or not plugged into a power source.

Figure 15:
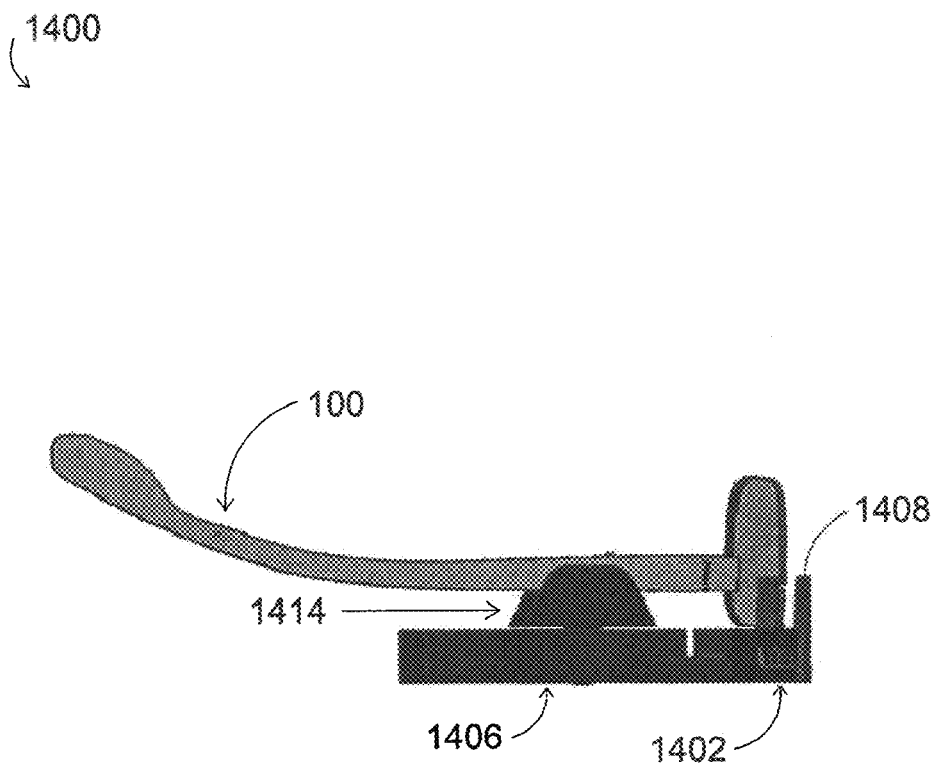
FIG. 15 illustrates a side view of the slim line charger depicted in FIG. 14 in accordance with an aspect of the present invention.

FIG. 15 illustrates a side view of the slim line charger 1400. As shown in FIG. 15, the electro active spectacles can be stabilized or supported by the charger 1400 at three locations—a front portion of the spectacles 100 (at or near the lenses of the electro-active spectacles 100), a right side temple area of the frame of the electro active spectacles 100

(shown in FIG. 15), and a left side temple area of the frame of the electro-active spectacles 100 (not shown in FIG. 15). The second adjustable charging area 1414 can be moved laterally to be in close proximity with any portion of the front temple area of the electro-active spectacles 100 (i.e., to place the second adjustable charging area 1414 in close proximity to an inductive charging area of the electro-active spectacles 100).

Figure 16:
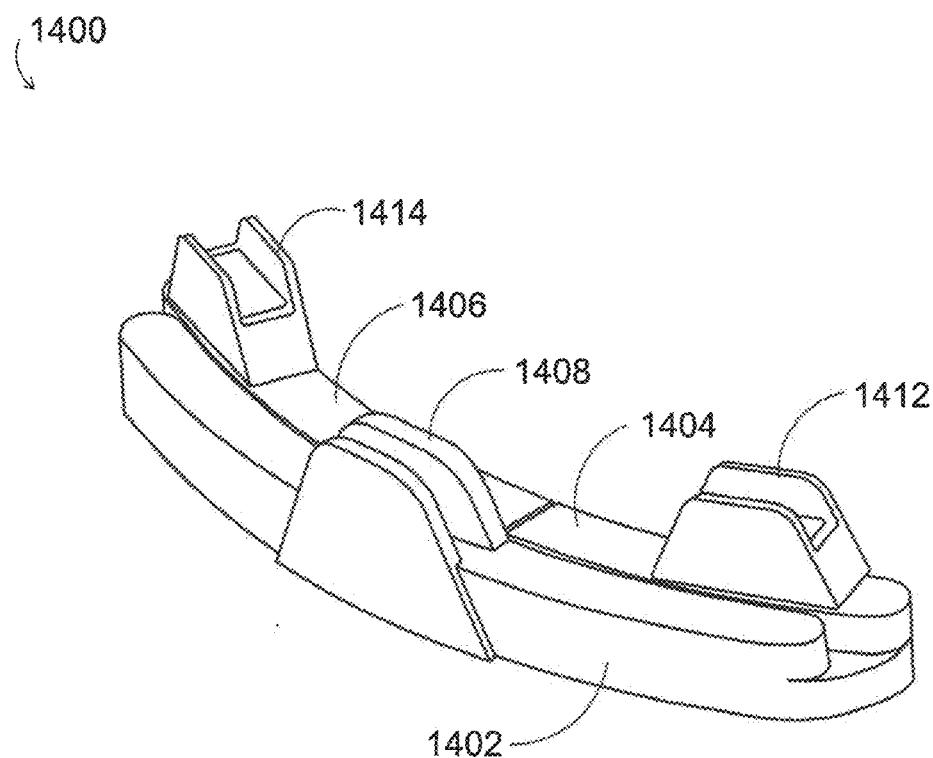
FIG. 16 illustrates the slim line charger of FIGS. 14 and 15 in a closed positioned in accordance with an aspect of the present invention.

FIG. 16 illustrates the slim line charger 1400 in a closed positioned. Specifically, the first and second arms 104 and 1406 have been rotated and positioned adjacent and parallel to the base member 1402. A hinge or lock or other device can be used to lock each of the first and second arms 1404 and 1406 in place. The charger 1400 can include a button, knob or other device to release the first and second arms 1404 and 1406 from their closed, locked positions.

Aspects of the present invention also include a charger case for electro-active spectacles having a top cover and a bottom cover as is found with conventional eyeglass cases. The charger case of the present invention can include one or more inductive charge regions and a power source. The power source of the charger case of the present invention can be rechargeable.

Conclusion

While various embodiments of the present invention have been described above, it should be understood that they have been presented by way of example and not limitation. Any conductive element described above (e.g., the upper or lower portions of the frame) can be entirely conductive (and possibly coated with non-conductive material) or can contain an embedded or buried conductive element (e.g., a conductive core) and a non-conductive outer or surrounding layer. Further, any conductive link—e.g., described or referred to as an electrical wire or connection—could alternatively, or in addition thereto, be or include an optical conductive link as will be apparent to one skilled in the pertinent art. The exemplary techniques for coupling or connecting the electrical elements of the electro-active spectacles of the present invention (e.g., the controlling electronics and power supplies and electro-active lenses) using embedded conductive links can be used to embed one or more conductive optical links (e.g., one or more optical fibers) as will be apparent to one skilled in the pertinent art.

Overall, it will be apparent to one skilled in the pertinent art that various changes in form and detail can be made therein without departing from the spirit and scope of the invention. Therefore, the present invention should only be defined in accordance With the following claims and their equivalents.

What is claimed is:

1. A device, comprising:
   an eyeglass frame having:
      a front; and
      a temple having a first end attached to the front and a second end opposite the first end;
   a battery disposed at the second end of the temple;
   an electronic module having electrical components located therein, the electronic module being disposed at the first end of the temple; and
   two conductive wires embedded in the temple, the conductive wires electrically connecting the battery to the electronic module;
   a lens supported by the eyeglass frame, the lens comprising:
      a first substrate;
      a second substrate attached to the first substrate;
      a groove disposed on and around an edge of the lens at an interface between the first and second substrates:
      a first electrical lead disposed between the first and second substrates;
      a second electrical lead disposed between the first and second substrate;
      a first conductive material placed in the groove on the first electrical lead;
      a second conductive material placed in the groove on the second electrical lead,
      wherein the first and second electrical leads provide electrical conductivity between the lens and the electronic module; and
   an electro-active lens supported by the eyeglass frame;
      wherein the eyeglass frame has an upper rim portion, a first conductor disposed within a groove of the upper rim portion of the eyeglass frame, a lower rim portion, and a second conductor disposed within a groove of the lower rim portion of the eyeglass frame, and
   wherein the eyeglass frame further includes an upper conducting member, a lower conducting member, and an insulating member.

2. The device of claim 1, wherein the battery is a rechargeable battery or a solar battery.

3. The device of claim 1, wherein the electronic module has a housing that contains the electrical components.

4. The device of claim 1. wherein the electrical components include a gyroscope.

5. The device of claim 1, wherein the electrical components include an accelerometer.

6. The device of claim 1, wherein the electronic module comprises a contact pad providing connectivity to the battery.

7. The device of claim 1, wherein the electronic module further includes an antenna.

8. The device of claim 7, wherein the electronic module is configured to be programmable via a wireless communication link.

9. The device of claim 7, wherein the electronic module further includes a light emitting diode (LED).

10. The device of claim 1, wherein the electronic module further includes a mechanism by which a user can interact with the electronic module.

11. The device of claim 10, wherein the mechanism is selected from the group consisting of a press button switch, a capacitive switch, and a toggle switch.

12. The device of claim 1, wherein the electronic module further includes an inductive charge area.

13. The device of claim 12, wherein the inductive charge area comprises inductive charge coils.

14. The device of claim 1, wherein the upper conducting member, the lower conducting member, and the insulating member physically couple the temple to the upper rim portion and the lower rim portion of the eyeglass frame.

15. The device of claim 14, wherein the upper conducting member, the lower conducting member, the insulating member, the upper rim portion, the lower rim portion, the first conductor, and the second conductor provide connectivity between the electronic module and the electro-active lens.

* * * * *